United States Patent
Okuma

(10) Patent No.: US 9,448,707 B2
(45) Date of Patent: Sep. 20, 2016

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Satoshi Okuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 14/013,543

(22) Filed: Aug. 29, 2013

(65) Prior Publication Data

US 2014/0089828 A1    Mar. 27, 2014

(30) Foreign Application Priority Data

Sep. 25, 2012  (JP) ................................. 2012-211531

(51) Int. Cl.
G06F 3/0484     (2013.01)
G03G 15/00      (2006.01)
G06F 3/0488     (2013.01)

(52) U.S. Cl.
CPC ....... *G06F 3/04845* (2013.01); *G03G 15/5016* (2013.01); *G06F 3/04883* (2013.01)

(58) Field of Classification Search
CPC ...................................................... G06F 3/048
See application file for complete search history.

(56) References Cited

U.S. PATENT DOCUMENTS

2011/0074710 A1*  3/2011  Weeldreyer et al. .......... 345/173

FOREIGN PATENT DOCUMENTS

JP            04-222063 A       8/1992

* cited by examiner

*Primary Examiner* — Peiyong Weng
(74) *Attorney, Agent, or Firm* — Cowan, Liebowitz & Latman, P.C.

(57) ABSTRACT

An information processing apparatus having a display unit and an input device capable of detecting a plurality of designated points designated on a screen, and its method of controlling the same. The apparatus detects, on a plurality of coordinates a plurality of designated points that a user designates on the input device, a movement of the coordinates, and a change in a distance between two designated points accompanying the movement, and performs enlargement or reduction of a whole image displayed on the display unit in a case where an operation of the user is a predetermined operation designating at least two points and a first condition is satisfied, and performs enlargement or reduction of a character displayed on the display unit in a case where an operation of the user detected the predetermined operation and a second condition is satisfied.

12 Claims, 18 Drawing Sheets

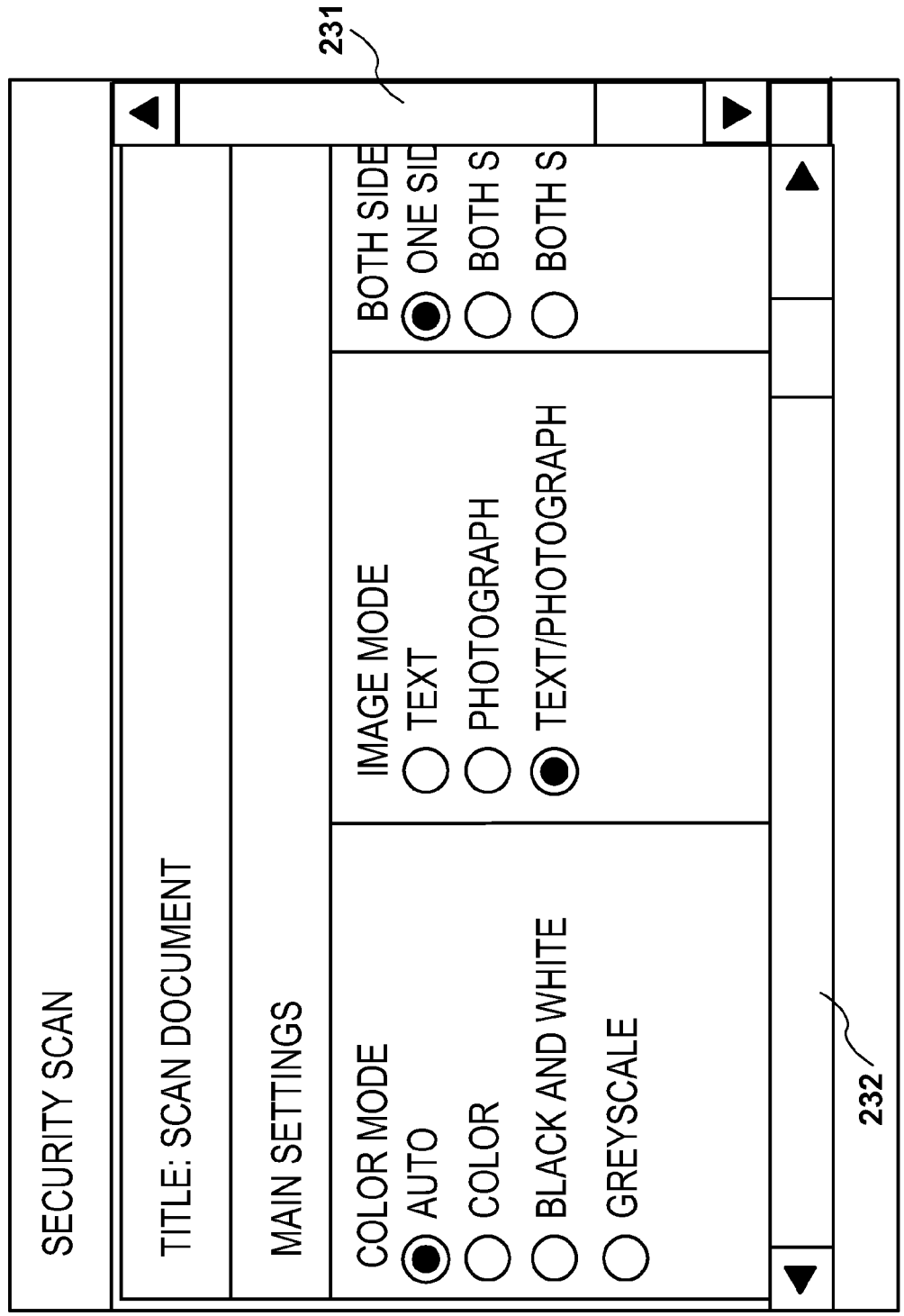

F I G. 11A
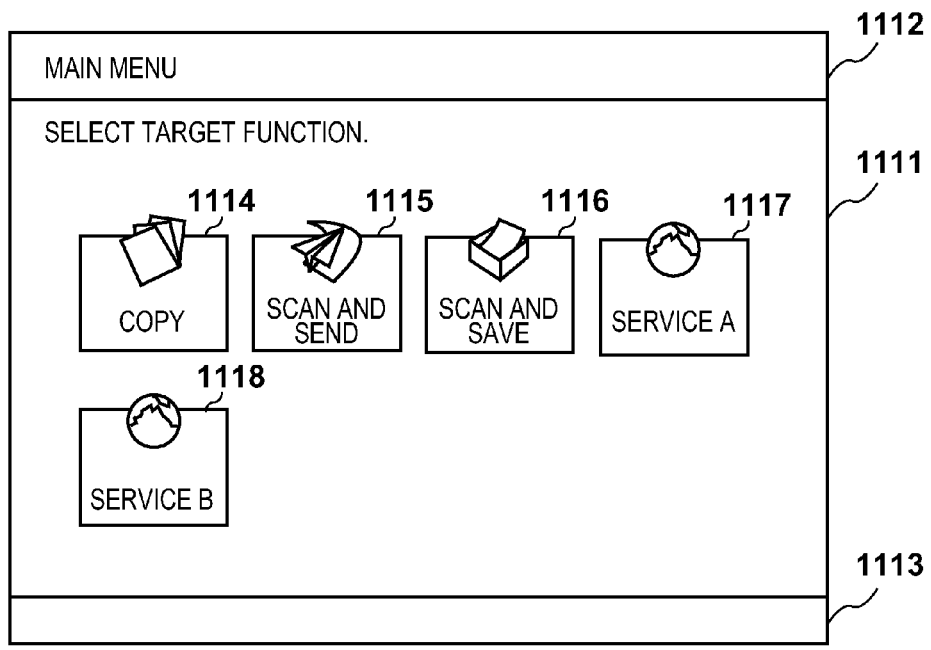
F I G. 11B
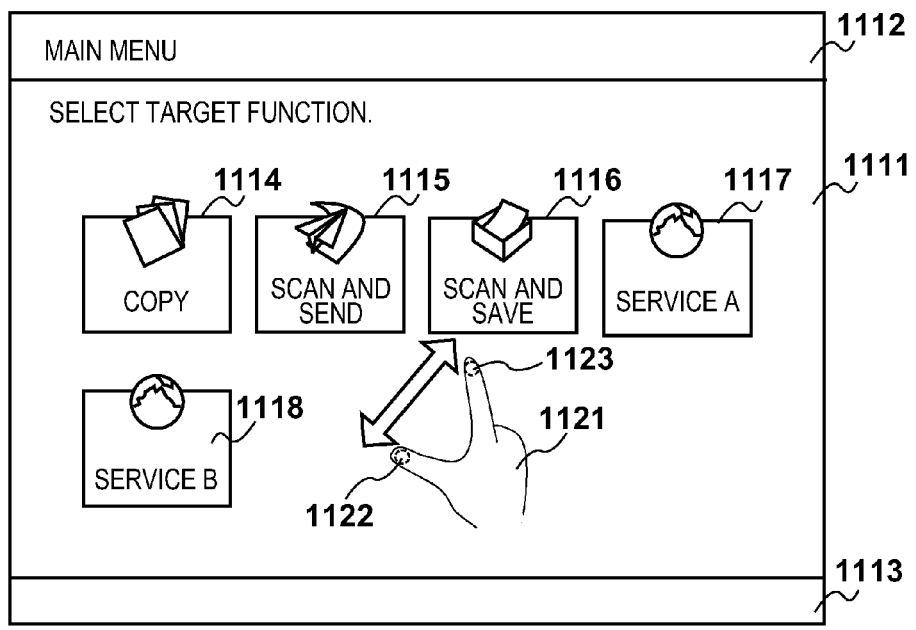

INFORMATION PROCESSING APPARATUS, METHOD OF CONTROLLING THE SAME, AND STORAGE MEDIUM

BACKGROUND OF THE INVENTION

1. Field of the Invention

The present invention relates to an information processing apparatus having an input device capable of searching for a plurality of designated points, and to a method and storage medium thereof.

2. Description of the Related Art

In recent years, computer devices having touch panels have become widespread. Amongst these kinds of computer devices, there are some that can perform processing having simultaneously detected a plurality of points that a user designated with his or her fingers or the like on the touch panel. Furthermore, amongst these kinds of computer devices, processing for changing an enlargement factor of an image that is being displayed in accordance with a distance between two points, when the two points having been designated by the user, are simultaneously detected, has become common. Amongst these, there exist examples in which when the user touches the touch panel using two fingers (his or her index finger and his or her thumb) simultaneously, and reduces the distance between the two points by performing an operation, with the two fingers, as though he or she were pinching the surface of the touch panel, a display image is reduced, and when the two fingers are spread apart, the display image is enlarged.

This kind of operation in which it is as though two fingers pinch the screen is commonly known as a pinch operation. This pinch operation is a very intuitive and easy to understand interface operation for the user because it is an operation in which an object is magnified by grabbing it with his or her fingers and spreading it apart, or in which an object is reduced by reducing a space between his or her fingers, as though he or she were handling a physical flexible object. Also, because the center point between the two points pinched by the fingers is treated at the center point for the enlargement or reduction, the user can easily and intuitively designate which part of the image on the screen he or she wishes to perform an enlargement or reduction on with the pinch operation. Also, it is possible to change a scaling factor of the screen in real-time in accordance with a movement amount of the movement of the fingers when the pinch operation is performed. For this reason, there is also an advantage in that the user can quickly set his or her desired scaling factor, without switching to a special setting screen for setting the display scaling factor.

In Japanese Patent Laid-Open No. H04-222063, though not the pinch operation, a user designating in order two points and an enlargement or reduction being performed on a rectangle image similar to a rectangle that passes through the two points is described as a method for designating a plurality of points in a display screen and performing an enlargement/reduction of the screen.

Normally, with a pinch operation in which a plurality of points are designated on such as screen, an enlargement or reduction of the whole image being displayed is performed. In a case where, due to the enlargement operation, the image cannot be displayed on the screen in its entirety, a part of the image is hidden. In this case, an operation such as a scroll becomes necessary in order to display the image of the part that was hidden.

Also, in a case where displayed characters on the screen are small and difficult to read, when enlargement of an image is performed by a pinch operation, because the whole image is enlarged, there are problems such as the essential character part protruding from the screen. For this reason, in a case where displayed characters on the screen are small and difficult to read, there is a desire to enlarge only the character size and not the whole image. However, because normally an enlargement or reduction of the character size is performed from a separate setting screen, an intuitive and immediate operation, such as the enlargement or reduction of the image with a pinch operation cannot be performed with an operation of enlargement or reduction of the character size using the setting screen. In this case, a method can be considered in which a target of the enlargement or reduction due to the pinch operation is switched in accordance with a mode, for example, between being made to be the whole image and being made to be the character size. However, in this case, there is a problem in that because an operation is necessary to switch the mode and so arrangements of operations increase, operability is worsened.

SUMMARY OF THE INVENTION

An aspect of the present invention is to eliminate the above-mentioned problems which are found in the conventional techniques.

A feature of the present invention is to provide a technique in which an instruction of an enlargement or reduction of the whole image and an instruction of an enlargement or reduction of a character size can each be easily and intuitively performed independently.

According to an aspect of the present invention, there is provided an information processing apparatus having a display unit and an input device capable of detecting a plurality of designated points designated on a screen of the display unit, the apparatus comprising:

an image enlargement/reduction unit configured to perform enlargement or reduction of a whole image displayed on the display unit;

a character enlargement/reduction unit configured to perform, independently of the image enlargement/reduction unit, enlargement or reduction of a character displayed on the display unit;

a detection unit configured to detect a plurality of coordinates of a plurality of designated points that a user designates on the input device, a movement of the coordinates, and a change in a distance between two designated points accompanying the movement; and a control unit configured to launch the image enlargement/reduction unit in a case where an operation of the user detected by the detection unit is a predetermined operation designating at least two points and a first condition is satisfied, and configured to launch the character enlargement/reduction unit in a case where an operation of the user detected by the detection unit is the predetermined operation and a second condition is satisfied.

According to another aspect of the present invention, there is provided a method of controlling an information processing apparatus having a display unit and an input device capable of detecting a plurality of designated points designated on a screen of the display unit, the method comprising:

performing enlargement or reduction of a whole image displayed on the display unit;

performing enlargement or reduction of a character displayed on the display unit independently of the performing enlargement or reduction of the whole image;

detecting a plurality of coordinates a plurality of designated points that a user designates on the input device, a movement of the coordinates, and a change in a distance between two designated points accompanying the movement; and launching the performing enlargement or reduction of the whole image in a case where an operation of the user detected in the detecting is a predetermined operation designating at least two points and a first condition is satisfied, and launching the performing enlargement or reduction of the character in a case where an operation of the user detected in the detecting is the predetermined operation and a second condition is satisfied.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A depicts a view for illustrating an example of a screen in which a scan setting screen is enlarged by the pinch operation of FIG. 2B.

FIG. 4A depicts a view for showing an example of the scan setting screen when the character size is actually enlarged by the pinch operation of FIG. 3B.

FIG. 11A depicts a view for illustrating an example of a function selection screen for selecting out of a plurality of functions that the information processing apparatus according to a fifth embodiment has.

FIG. 11B depicts a view for explaining an enlargement of an image by the pinch operation according to the fifth embodiment.

FIG. 12B is performed during display of the operation screen as in FIG. 11A in an information processing apparatus 101 according to the fifth embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
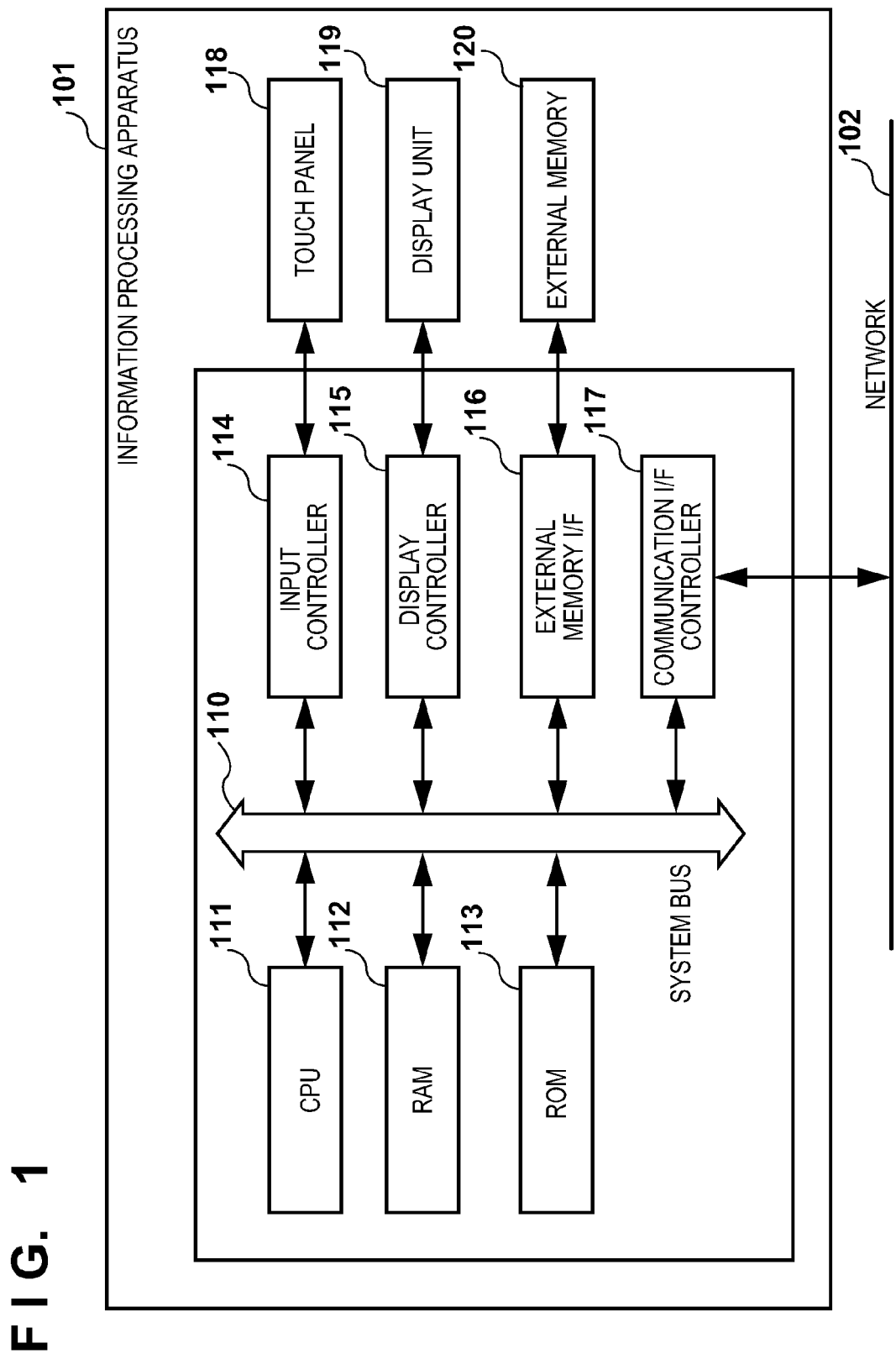
FIG. 1 is a block diagram for illustrating a hardware configuration of an information processing apparatus according to an embodiment of the present invention.

FIG. 1 is a block diagram for illustrating a hardware configuration of an information processing apparatus 101 according to the embodiment of the present invention.

A CPU 111, a RAM 112, a ROM 113, an input controller 114, a display controller 115, an external memory I/F 116 and a communication I/F controller 117 are connected to a system bus 110. Also, a touch panel 118, a display unit 119 and an external memory 120 are connected via the input controller 114, the display controller 115 and the external memory I/F 116 respectively. A system bus 110 has an address bus, a data bus or a control signal bus, and each unit connected to the system bus 110 is configured to be able to perform data exchange with each other via the system bus 110.

The ROM 113 is a non-volatile memory and stores in predetermined regions image data, other data, various programs for the CPU 111 to operate and the like. The RAM 112 is a volatile memory and is used as a main memory of the CPU 111 and as a temporary storage area such as a work area. The CPU 111 controls operation of the information processing apparatus 101 on the whole, using the RAM 112 as a work memory, in accordance with programs loaded into the RAM 112 from the ROM 113 or the external memory 120.

The input controller 114 receives operations from the user, generates control signals in accordance with the operations and supplies them to the CPU 111. For example, the input controller 114 controls an interface with an input device for receiving user operations such as a character information input device such as a keyboard (not shown), a pointing device (not shown), or the touch panel 118. Note, the touch panel 118 is an input device for outputting coordinate information corresponding to a touched position to an input unit that is configured as a surface level to the screen for example. The CPU 111 controls units of the information processing apparatus 101 in accordance with a program based on control signals generated and supplied by the input controller 114 in accordance with a user operation performed on the touch panel 118. With this, the information processing apparatus 101 is able to execute operation in accordance with operation of the user.

The display controller 115 outputs display signals for causing an image to display on the display unit 119. The CPU 111 supplies display control signals generated in accordance with a program to the display controller 115. The display controller 115 causes a GUI screen constituted in a GUI (Graphical User Interface) to be displayed on the display unit 119 based on these display control signals. Note, the previously described touch panel 118 is comprised in the same body as the display unit 119. The touch panel 118 is configured so to have a light transmittance that does not obstruct display of the display unit 119 and is installed in an upper layer (surface) of a screen of the display unit 119. The CPU 111 associates input coordinates on the touch panel 118 with display coordinates on the display unit 119. With this, it is possible to configure a GUI by which a user can directly operate on an image displayed on the screen of the display unit 119.

An external memory 120 such as a hard disk (HD), an FD, a CD, a DVD, a memory card, for example, may be mountable to the external memory I/F 116. Based on control of the CPU 111, the external memory I/F 116 performs reading out of data from the mounted external memory 120 and writing out of data to the external memory 120. The communication I/F controller 117 performs communication with, for example, a network 102 such as a LAN, the Internet, a wired network, or a wireless network based on control of the CPU 111.

Note, the CPU 111 can detect the following operations on the touch panel 118 and states, for example.

(a) The touch panel 118 being touched by a finger or a pen (hereinafter referred to as a TOUCH-DOWN).

(b) A state in which the touch panel 118 is being touched by a finger or a pen (hereinafter referred to as a TOUCH-ON).

(c) A finger or a pen moving while touching the touch panel 118 (hereinafter referred to as a MOVE).

(d) A finger or a pen that was touching the touch panel 118 being released (hereinafter referred to as a TOUCH-UP).

(e) A state in which nothing is touching the touch panel 118 (hereinafter referred to as a TOUCH-OFF).

These operations, and position coordinates for where the finger or pen touches on the touch panel 118 are sent in notification to the CPU 111 via the system bus 110 and the CPU 111 determines what kind of operation is performed on the touch panel 118 based on the notified information. For the MOVE, for a movement direction of the finger or pen moving on the touch panel 118, a vertical component and a horizontal component on the touch panel 118 can be determined based on a change in the position coordinates.

Also the touch panel 118 is able to simultaneously detect a plurality of locations at which the TOUCH-ON or the MOVE is performed. There are times when the user, from a state in which he or she is touching the touch panel 118 with two fingers or pens, and he or she moves his or her fingers or pens in relation to an orientation of a line segment linking those two points so as to shrink or to stretch a distance between the two points. The user makes the instruction by bringing near or separating two fingers that are performing the TOUCH-ON, and because this operation is similar to an act of pinching or stretching an object with one's finger it is called a pinch operation. Normally, the pinch operation is most often made using the user's thumb and index finger. The CPU 111 determines that the pinch operation was performed when, from a state in which the TOUCH-ON is being performed at two points simultaneously, and one or both of the points being touched moves. Also, the CPU 111 is able to calculate a center point coordinate for a line segment linking the two points in the pinch operation and a distance between the two points. For the touch panel 118, for example a resistive type, a capacitance type, a surface acoustic wave type, an infrared ray type, an electromagnetic induction type, an image recognition type, an optical sensor type or any other of the various types of touch panel may be used.

FIG. 2A through FIG. 6 depict views for explaining operation on images displayed on the display unit 119 of the information processing apparatus 101 according to the present embodiment and on the touch panel 118 arranged on the screen.

Figure 2A:
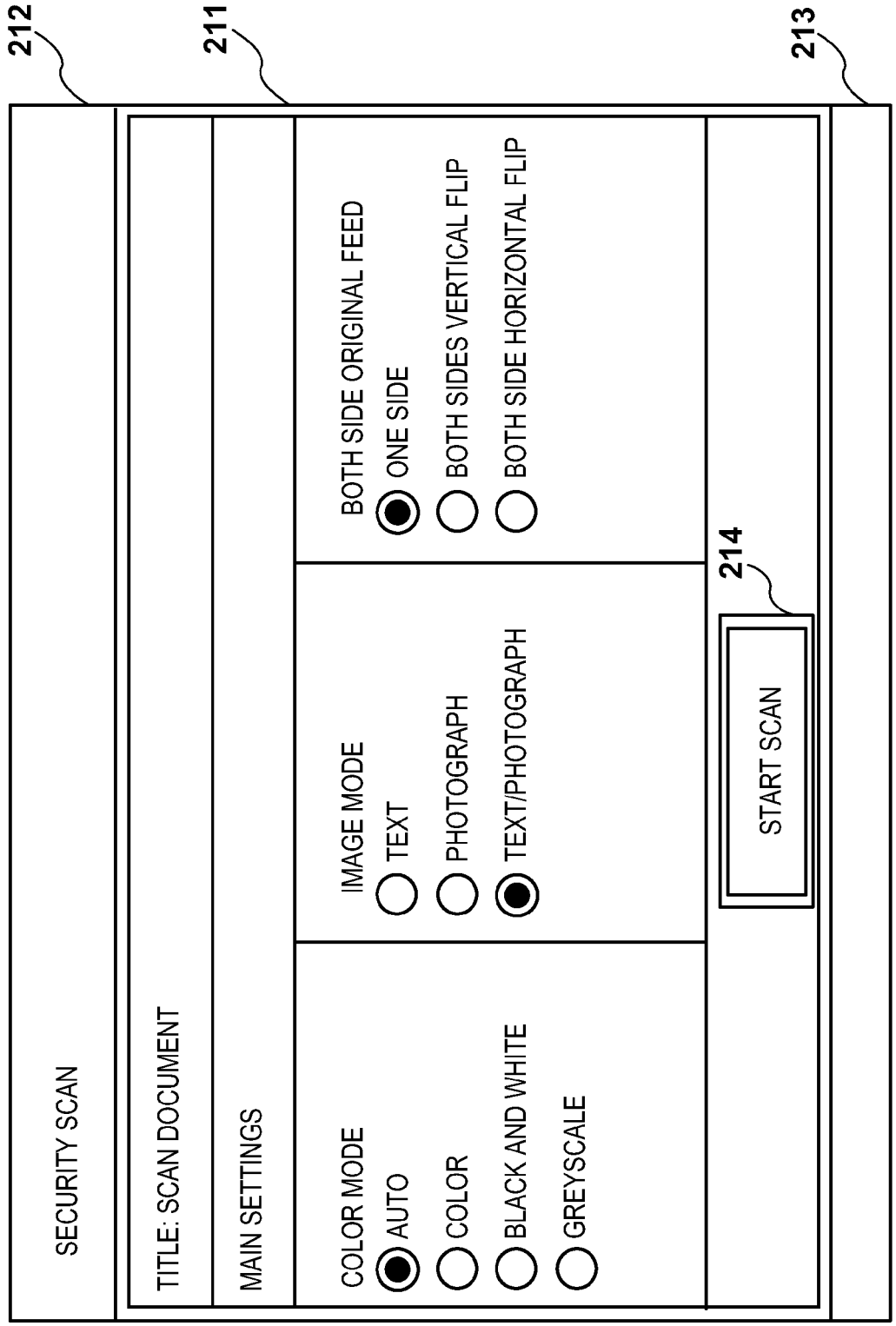
FIG. 2A depicts a view for illustrating an example of a setting screen of a scan operation for optically scanning an original and converting it into digital data that the information processing apparatus displays.

FIG. 2A depicts a view for illustrating an example of a setting screen (hereinafter referred to as the scan setting screen) of a scan operation for optically scanning an original and converting it into digital data that the information processing apparatus 101 displays. A scanner (not shown), which is an optical image reading apparatus, is connected to the system bus 110 of the information processing apparatus 101, and image data scanned by the scanner is saved in the RAM 112 or the external memory 120 under the control of the CPU 111. Alternatively, setting data set in the setting screen of FIG. 2A is transmitted to another information processing apparatus connected to the network 102 via the communication I/F controller 117 and scanned using a scanner connected to the other information processing apparatus.

In FIG. 2A, a scan setting screen 211 is a setting screen for reading in an original by scanning. In FIG. 2A, an area 212 in the top part of the screen is an area for displaying a title of the display screen. This display area 212 constantly displays a determined title irrespective of the display content of the scan setting screen 211. An area 213 in the bottom part of the screen of FIG. 2A is a display area of a device status. This area 213 is a display area for notifying the user, in a case where there some kind of error in the state of the information processing apparatus 101, of the details. This display area 213 displays predetermined content regardless of the display content of the scan setting screen 211. A scan initiation button 214 is an instruction button for causing scanning to initiate in accordance with setting details set in the scan setting screen 211.

In this kind of scan setting screen 211, in a case where a character size in which various setting content is displayed is small and difficult to see, the user has a need to enlarge the displayed characters or the whole image of the scan setting screen 211.

Figure 2B:
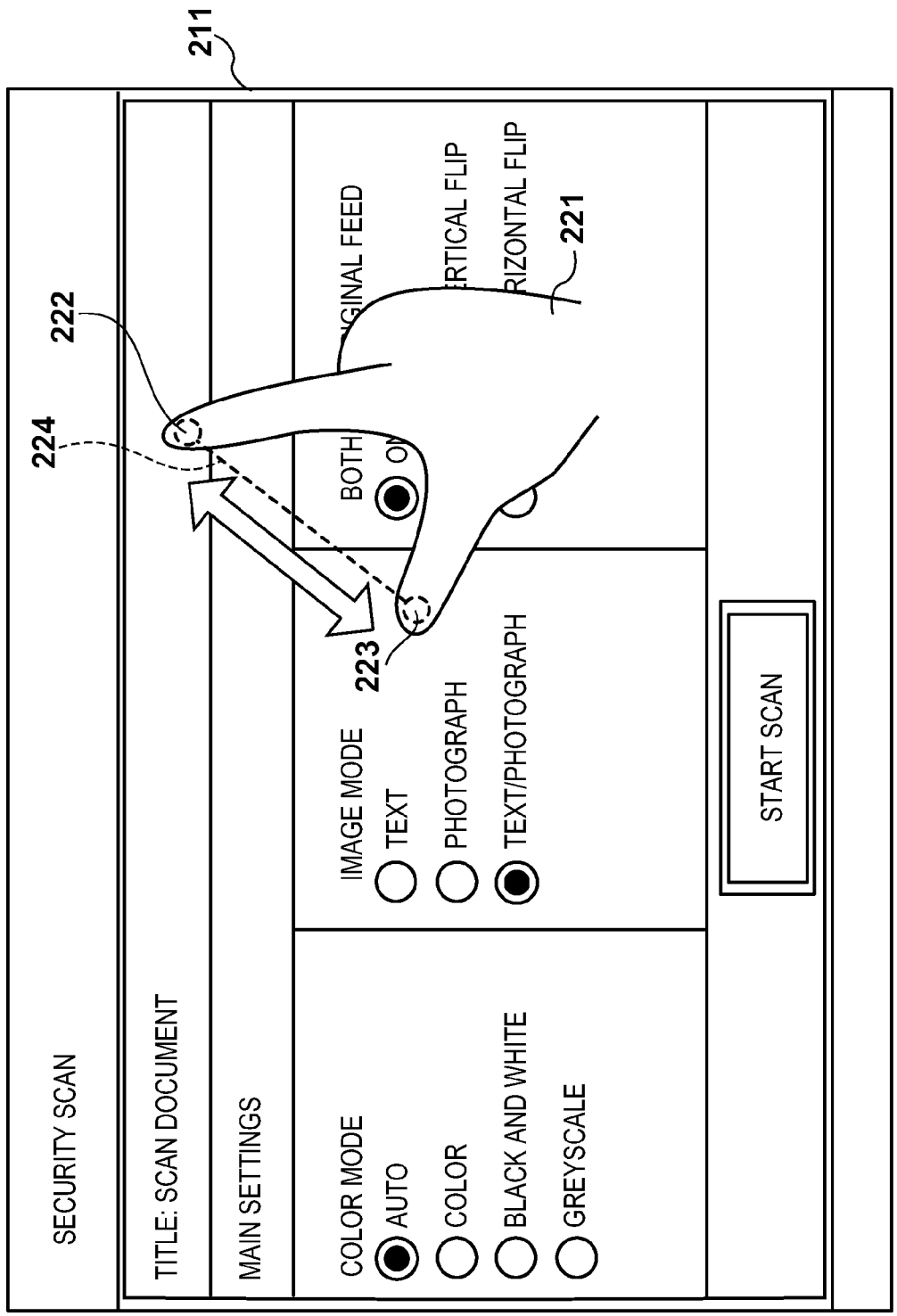
FIG. 2B depicts a view for explaining an operation for enlarging an image by a pinch operation.

FIG. 2B depicts a view for explaining an operation for enlarging an image by a pinch operation.

In FIG. 2B, reference numeral 221 denotes a hand action of user performing the pinch operation on the touch panel 118 arranged on the display unit 119. Normally, the pinch operation is made by the user using his or her index finger and thumb on his or her hand, simultaneously touching the tips of these two fingers onto the touch panel 118 and performing an action of widening or narrowing a space between the two fingers while continuing to touch the touch panel 118. Here, a line segment 224 which links designated points 222 and 223 where the two fingers touch the touch panel 118 in the pinch operation is called the orientation of the pinch operation. Because the pinch operation is a one-dimensional action of stretching or shrinking the space between the two designated points, the pinch operation orientation on a two-dimensional plane is constant. Strictly speaking, when the space between the two designated points is stretched or shrunk, a certain rotational deviation occurs with respect to the orientation of the pinch operation. However, in actuality, the orientation of the pinch operation is considered to be constant where a certain amount of the rotational deviation occurring upon stretching and shrinking is considered to be within a tolerable level.

The designated points 222 and 223 in the pinch operation 221 shown in FIG. 2B are not touching any of the displayed characters on the scan setting screen 211 and the orientation of the line segment 224 is not horizontal with respect to the display of the scan setting screen 211. In this case, the pinch operation is FIG. 2B is determined to be an enlargement instruction for the whole image of the scan setting screen 211 and enlargement processing is performed on the scan setting screen 211 as a whole.

FIG. 3A depicts a view for illustrating an example of a screen in which an image of the scan setting screen 211 was enlarged by the pinch operation 221 of FIG. 2B.

In FIG. 3A, the scan setting screen 211 of FIG. 2A is enlarged on the whole while maintaining the horizontal to vertical aspect ratio. In this way, by enlarging the whole image of the scan setting screen 211, the whole image of the scan setting screen 211 cannot be fit into the screen, and a part of the scan setting screen 211 protrudes out of the screen. For this reason, a vertical scroll bar 231 and a horizontal scroll bar 232 are displayed, which allows the user to check the whole of the scan setting screen 211 by operating the scroll bars 231 and 232 to scroll the image.

Also, in FIG. 3A, along with the whole image of the scan setting screen 211 being enlarged, the displayed characters are also displayed having been enlarged. With this, the image of the scan setting screen 211 is enlarged due to the pinch operation of FIG. 2B, and as a result, the user is able to display the screen, as in the screen of FIG. 3A, with the desired character size.

However, in FIG. 3A, due to the enlargement of the whole image of the scan setting screen 211, the scan initiation button 214 of FIG. 2A, et cetera, protrudes out of the display screen, and part of the image of the scan setting screen 211 is not displayed. For this reason, in a case where an operation is performed on a part that protrudes from the screen, it becomes necessary to either display the part that is not being displayed by operating the scroll bars 231 and 232, or by performing an operation for reducing the image with another pinch operation. In a case where the character size of the characters is small and thus difficult to read, it would be desirable to make an instruction so that only the character size be enlarged, but conventionally such an instruction has been required to be performed having switched to a separate setting screen, and so compared to an instruction for enlargement/reduction of characters with the pinch operation, cumbersome operation has been necessary.

First Embodiment

Figure 3B:
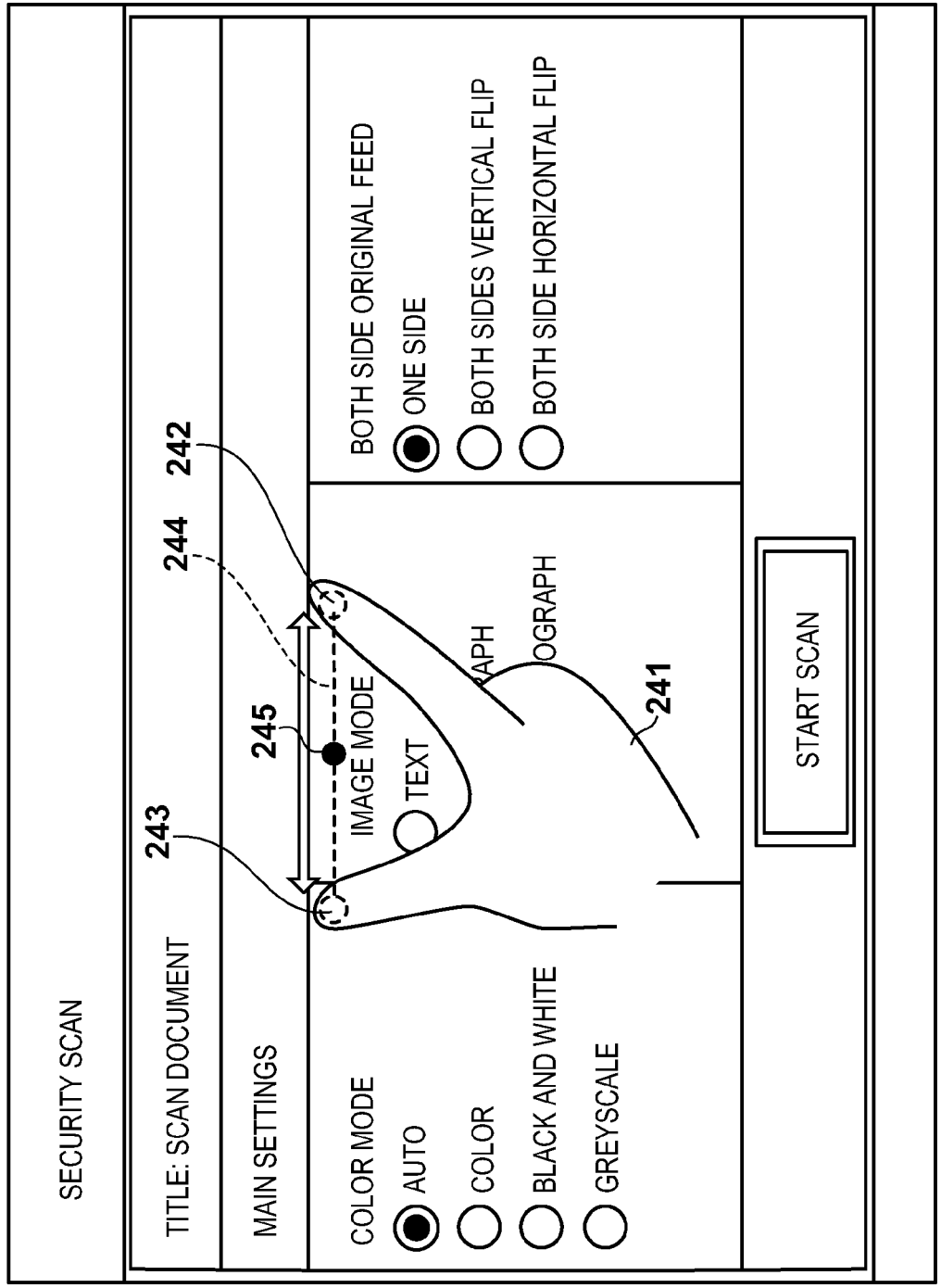
FIG. 3B depicts a view for explaining an operation method for changing a displayed character size according to a first embodiment.

FIG. 3B depicts a view for explaining an operation method for changing a displayed character size according to a first embodiment of the present invention.

Reference numeral 241 denotes a hand action of the user performing the pinch operation on the touch panel 118 arranged on the display unit 119. In the action 241, a character exists at a center point 245 of a line segment 244 linking designated points 242 and 243 designated by two fingers. Furthermore, the orientation of the pinch operation, which is the orientation of the line segment 244, is horizontal with respect to the screen. When such a pinch operation is received, it is determined that an enlargement or reduction of the displayed characters is instructed, and an enlargement or reduction operation of the characters is performed.

FIG. 4A depicts a view for showing the scan setting screen when the character size was actually enlarged by the pinch operation of FIG. 3B.

In FIG. 4A, in relation to the scan setting screen 211 of FIG. 2A, only the character size has become larger. Here, because the screen layout other than the characters has not changed, the scan initiation button 214 is also displayed. Accordingly, there is no need for the user to perform operation for transitioning to a special screen for specifying the character size, and the character size of the scan setting screen 211 alone can be changed. Also, on this screen in which the character size is enlarged, because the layout of the scan setting screen 211 has not changed, an operation of making an instruction on the scan initiation button 214 is possible.

In this way, according to the first embodiment, it is possible to independently make, with the pinch operation, both an image enlargement/reduction instruction for the operation screen and a displayed character size enlargement/reduction instruction for the screen. Note, the orientation of the pinch operation is made to be horizontal with respect to the display content when instructing the enlargement/reduction of the character size, but it does not have to be a strictly horizontal orientation. Amongst operations made by the users with his or her finger or the like, because a rotational deviation may occur from the orientation of the pinch operation, a certain amount of difference in the orientation is treated as being within a tolerable level.

Also, in the above described first embodiment, whether or not the instruction is for an enlargement or reduction of the character size is determined based on whether or not a character existed at the center point 245 of the line segment 244 linking the designated points 242 and 243 designated by the two fingers, but the present invention is not limited to this. For example, the determination may be made based on whether or not a character exists not just at the center point 245 but also at a location close to the center point 245.

Next, with reference to FIG. 7, explanation will be given for operation of the information processing apparatus 101 according to the first embodiment of the present invention.

Figure 7:
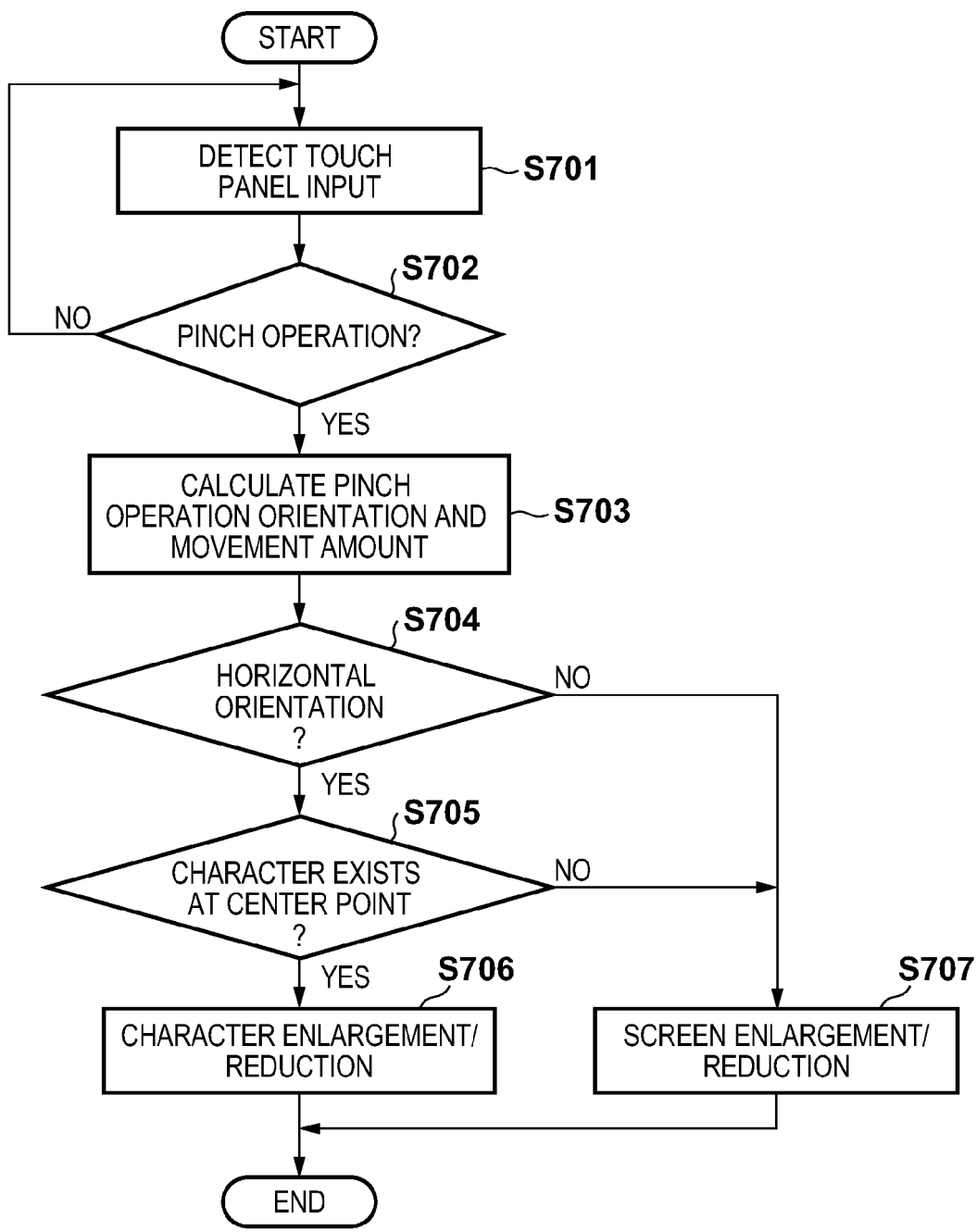
FIG. 7 is a flowchart for describing processing executed when the pinch operation is performed in the information processing apparatus according to the first embodiment.

FIG. 7 is a flowchart for describing processing executed when the pinch operation shown in FIG. 2B or FIG. 3B is performed during display of the operation screen as in FIG. 2A in the information processing apparatus 101 according to the first embodiment. Note, each processing step (step) of the flowchart of FIG. 7 is realized by the CPU 111 executing a control program stored in the ROM 113 or the external memory 120 of the information processing apparatus 101.

Firstly, in step S701, the CPU 111 monitors for an operation instruction on the touch panel 118 based on signals input from the touch panel 118 via the input controller 114. In step S702, the CPU 111 determines whether or not an instruction from the user input from the touch panel 118 is the pinch operation. Specifically, it determines whether or not designation of two points is performed simultaneously on the touch panel 118 and the MOVE is performed with either (or both) of the two points on the one-dimensional line linking these two points. Here, the MOVE is not necessarily strictly on the one-dimensional line, and even in a case where there is a certain degree of deviation from the line, it is treated as being within a tolerable level, and the operation is treated as the pinch operation. In a case where in step S702 it is determined that the pinch operation is not performed, the processing returns to step S701.

In a case where in step S702 it is determined that the pinch operation is performed, the processing proceeds to step S703, and the CPU 111 calculates the orientation of the pinch operation, and a movement amount of the two points that are designated. Here the movement amount is a value indicating how much the distance between the two points designated on the touch panel 118 changed. Next, the processing proceeds to step S704, and the CPU 111 determines whether or not the orientation of the pinch operation acquired in step S703 is a horizontal orientation with respect to the display content of the operation screen displayed on the display unit 119. Normally, the touch panel 118 is arranged horizontally with respect to the display screen of the display unit 119. For this reason, when the touch panel 118 is capable of detecting coordinates of two axes perpendicular to one another, one of these axes is horizontal with respect to the display screen of the display unit 119. Because here one of the coordinate axes is predetermined to be horizontal with respect to the display screen of the display unit 119, if only a coordinate value on that coordinate axis changes, the result is that it is determined that this is horizontal with respect to the display screen of the display unit 119. In this case, the amount of change of the coordinate value on the coordinate axis perpendicular to the display screen is ideally 0, but because there may be a deviation of the hand or the like, it is treated to be a change only in the coordinate value of the coordinate axis horizontal with respect to the display screen if the amount is within a predetermined amount.

In a case where in step S704 it is determined that the orientation of the pinch operation is horizontal with respect to the display screen, the processing proceeds to step S705, and the CPU 111 determines whether or not a character exists at a center point of the two points designated by the pinch operation or close to the center point. Here, because the coordinates on the touch panel 118 and the coordinates on the image displayed on the display unit 119 are pre-associated, it is easy to associate the coordinates on the touch panel 118 and the displayed characters. Here, the CPU 111 saves, into the RAM 112, the coordinates of the characters for which display to the display controller 115 is instructed, and so by comparing these with the coordinates of the center point of the pinch operation, it is possible to determine whether or not a character exists at the center point of the pinch operation or close to it. Also, in a case where the scan setting screen 211 displays a structured document such as an HTML document with a Web browser, or the like, because it is possible to save into the RAM 112 character display coordinates, it is possible to determine whether or not a character exists at a center point of the pinch operation or near to the center point.

In a case where in step S705 it is determined that a character is displayed at a center point of the pinch operation or near to the center point, the processing proceeds to step S706, and the CPU 111 performs enlargement/reduction processing for the character size (character enlargement/reduction) in accordance with the movement amount acquired in step S703. Here, in a case where the distance between the two points increases based on the movement amount of the pinch operation calculated in step S703, process is performed for an enlargement of the character size, and in a case where the distance between the two points is reduced, processing is performed for a reduction of the character size. Here, the enlargement amount and the reduction amount are made to be proportional to the movement amount of the pinch operation. With this, a post enlargement or reduction character size is calculated for each displayed character string, display of the screen on the whole is reconfigured using the calculated character size, and display to the display unit 119 is performed via the display controller 115.

On the other hand, in a case where it is determined in step S704 that the orientation of the pinch operation is not horizontal with respect to the screen of the display unit 119, or, in a case where, in step S705, it is determined that a character does not exist at the center point of the two points designated with the pinch operation or near to the center point, the processing proceeds to step S707. In step S707, the CPU 111 performs whole image enlargement or reduction processing (image enlargement/reduction). In this case as well, in a case where the distance between the two points increases based on the movement amount of the pinch operation calculated in step S703, processing is performed for an enlargement, and in a case where the distance between the two points is reduced, processing is performed for a reduction. Here, the enlargement amount and the reduction amount are made to be proportional to the movement amount of the pinch operation. With this, the sizes of each constituent element of the image for after the enlargement or reduction of the whole image is calculated, and based on this, the display image on the whole is reconfigured, and display to the display unit 119 via the display controller 115 is performed. Here, in a case where there is content which does not fit onto the screen due to the enlargement, the scroll bars 231 and 232 are displayed on the right part and the bottom part of the screen.

In this way, according to the first embodiment, in a case where the orientation of the pinch operation is horizontal with respect to the display screen of the display unit 119 and a character is displayed at the center point of the two points designated by the pinch operation or near to the center point, it is determined that the pinch operation is an operation for enlargement/reduction of the character size. Also, in a case where the pinch operation is performed under conditions other than this, it is determined that it is an operation for enlargement or reduction of the whole image.

With this, it becomes possible to instruct independently enlargement/reduction of the character size and enlargement/reduction of the whole image in accordance with the conditions when the pinch operation is performed, and it is possible to easily make these respective instructions without the need for the user to perform cumbersome operation.

Second Embodiment

In the second embodiment, in the decision as to whether or not the pinch operation is instructed for enlargement/reduction of the character size, matching of the orientation of the pinch operation and the display orientation of a character string, and the presence or lack thereof of a character at the designated point are made to be determination conditions for whether or not enlargement/reduction of the character size is being instructed. Explanation of the second embodiment will be given focusing on differences with the first embodiment. Note, because the hardware configuration of the information processing apparatus 101 according to the second embodiment is the same as in the previously described first embodiment, its explanation will be omitted.

Figure 4B:
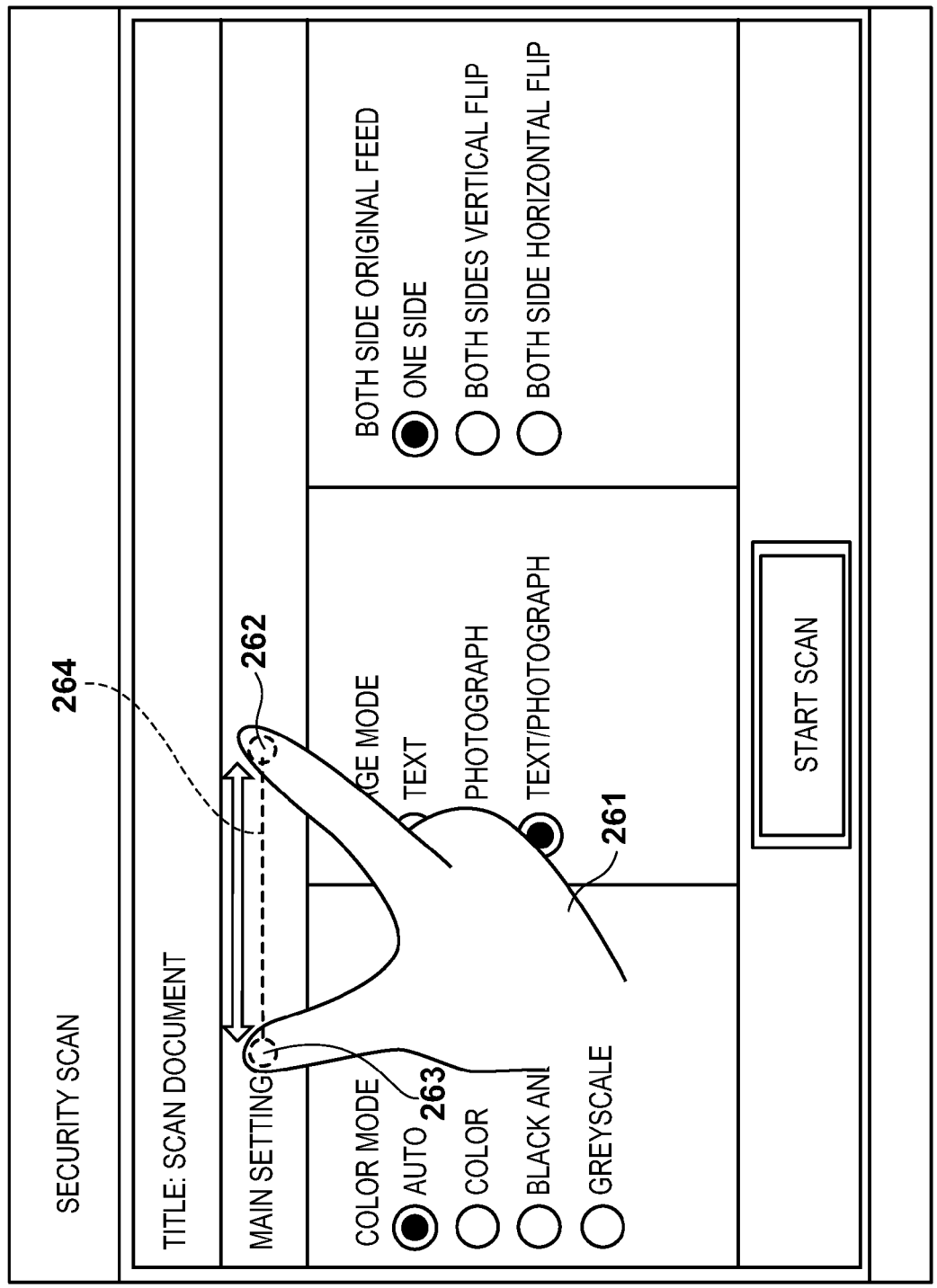
FIG. 4B depicts a view for explaining an operation method for changing the displayed character size according to a second embodiment.

FIG. 4B depicts a view for explaining an operation method for changing a displayed character size according to a second embodiment of the present invention.

Reference numeral 261 denotes a hand action of the user performing the pinch operation on the touch panel 118 arranged on the display unit 119. In the action 261, a displayed character exists at one designated point (in this case, at a point 263) of the designated points 262 and 263 designated by two fingers. Furthermore, an orientation 264 of the pinch operation matches with the text direction of a character string displayed at the designated point 263 where a displayed character exists. When this kind of pinch operation is received, it is determined that enlargement or reduction of the displayed character there is being instructed, and the operation of enlargement or reduction of the character size is performed.

With the pinch operation of FIG. 4B, the operation screen, in which the character size has been enlarged, is a screen like that shown in FIG. 4A, as in the previously described first embodiment. Also, in a case where the pinch operation is performed under conditions other than those described above, the point that enlargement or reduction of the whole image is performed is the same as in the previously described first embodiment.

Next, with reference to FIG. 8, explanation will be given for operation of the information processing apparatus 101 according to the second embodiment.

Figure 8:
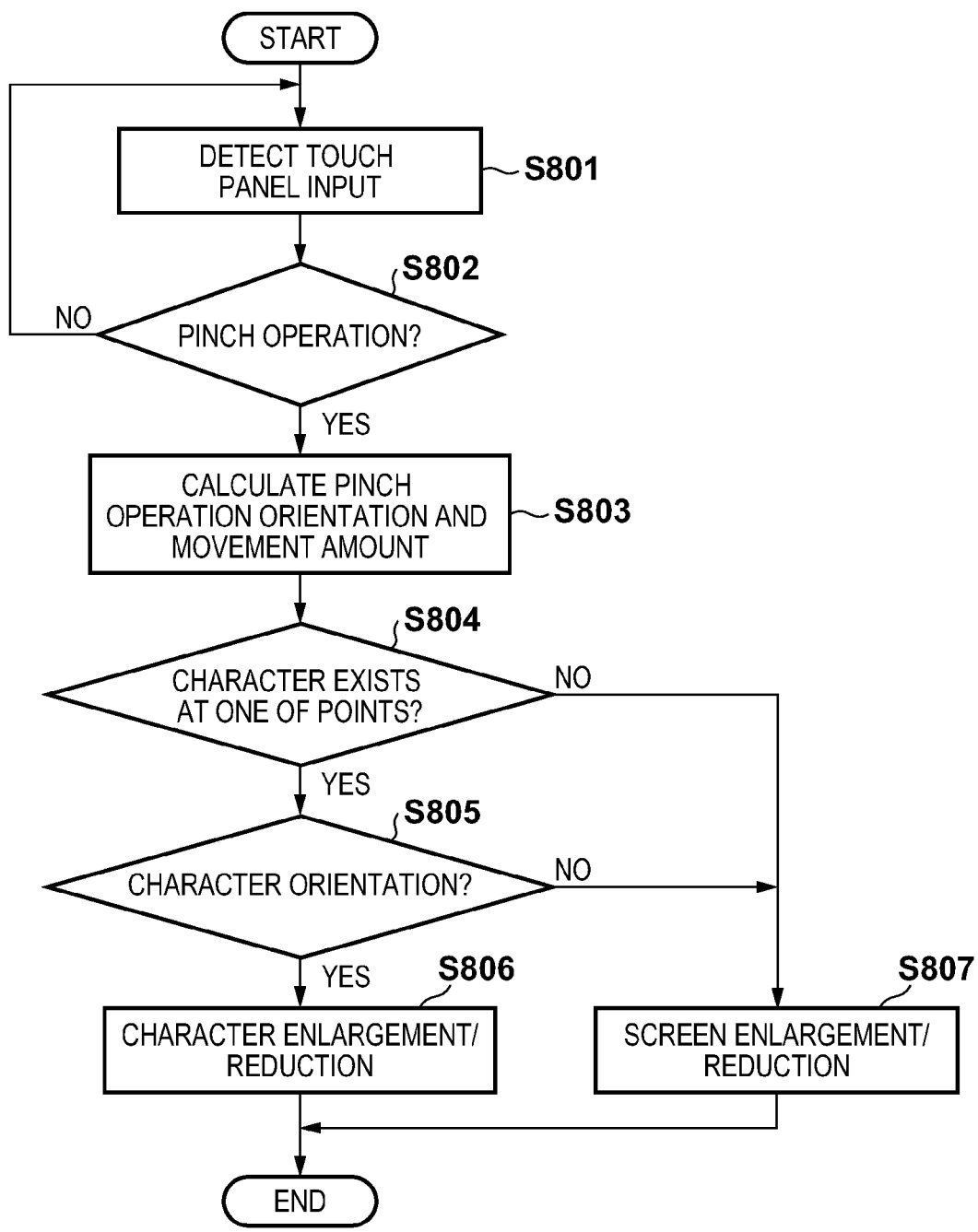
FIG. 8 is a flowchart for describing processing executed when the pinch operation is performed in the information processing apparatus according to the second embodiment.

FIG. 8 is a flowchart for describing processing executed when the pinch operation shown in FIG. 4B is performed during display of the operation screen as in FIG. 2A in the information processing apparatus 101 according to the second embodiment. Note, each processing step of the flowchart of FIG. 8 is realized by the CPU 111 executing a control program stored in the ROM 113 or the external memory 120 of the information processing apparatus 101.

Processing in step S801 through step S803 in FIG. 8 is similar to that of step S701 through step S703 in the previously described FIG. 7, and so explanation of these will be omitted.

In step S804, the CPU 111 determines whether or not a character exists at either of the coordinates at the two designated points designated with the pinch operation. Here, in the same way as in the first embodiment, determination can be made by comparing the coordinates of the displayed characters stored in the RAM 112 and the coordinate of the two designated points. In a case where in step S804 it is determined that a character exists at either of the coordinates at the two designated points, the processing proceeds to step S805 and the CPU 111 determines whether or not the orientation of the pinch operation designated with the pinch operation matches the text direction of the character string that the designated point at which the character exists designates. The CPU 111 stores the text direction of the character string in the RAM 112 along with the character coordinates when display of the character string is instructed to the display controller 115. With this, the CPU 111 compares information of the RAM 112 indicating the text direction of the character string determined in step S804 to exist at the designated point and the orientation of the pinch operation calculated in step S803. Next, in a case where in step S805 it is determined that the orientation of the pinch operation matches with the text direction of the character string, the processing proceeds to step S806 and the CPU 111 performs enlargement or reduction processing of the character size based on the movement amount of the two points in the pinch operation. The processing here is similar to the processing in step S706 of FIG. 7 in the previously described first embodiment.

Meanwhile, in a case where in step S804 it is determined that characters do not exist at either of the designated points, or in a case where it is determined, in step S805, that the orientation of the pinch operation and the text direction of the character string do not match, the processing proceeds to step S807, and the CPU 111 performs enlargement or reduction processing on the whole image based on movement amounts of the two points in the pinch operation. The processing here is similar to the processing in step S707 of FIG. 7 in the previously described first embodiment.

In this way, according to the second embodiment, in a case where a character is displayed at either of the two points designated in the pinch operation and the orientation of the pinch operation matches the text direction of the character string at the designated point, it is determined that the pinch operation is an operation for enlargement/reduction of the character size. Also, in a case where the pinch operation is performed under conditions other than this, it is determined that it is an operation for enlargement/reduction of the whole image. With this, it becomes possible to instruct independently enlargement or reduction of the character size and enlargement or reduction of the whole image in accordance with the conditions when the pinch operation is performed, and it is possible to easily make these respective instructions without the need for the user to perform cumbersome operation.

Whereas in the previously described first embodiment, in the pinch operation a character string having a horizontal orientation is pinched and caused to stretch or shrink, in the second embodiment, in the pinch operation a character on the display screen is designated by either of the fingers and by causing the character to move the character string is caused to be stretched and shrunk. Furthermore, in the first embodiment, determination is only made as to whether or not the orientation of the pinch operation is a horizontal orientation, but in the second embodiment, determination is made as to whether or not the text direction of the character string including the designated character matches the orientation of the pinch operation. With this, even in a case where characters on the screen are displayed on an orientation for vertical text, it is possible to easily designate make the instruction for enlargement or reduction of the character size.

Third Embodiment

In the third embodiment, when determining as to whether or not the pinch operation is instructed for enlargement/reduction of the character size, the existence or lack thereof of a character at a third designated point separate from the pinch operation is made to be the basis of the determination for whether or not enlargement/reduction of the character size is being instructed when the pinch operation is performed. Explanation of the third embodiment will be given focusing on differences with the first embodiment. Note, because the hardware configuration of the information processing apparatus 101 according to the third embodiment is the same as in the previously described first embodiment, its explanation will be omitted.

Figure 5A:
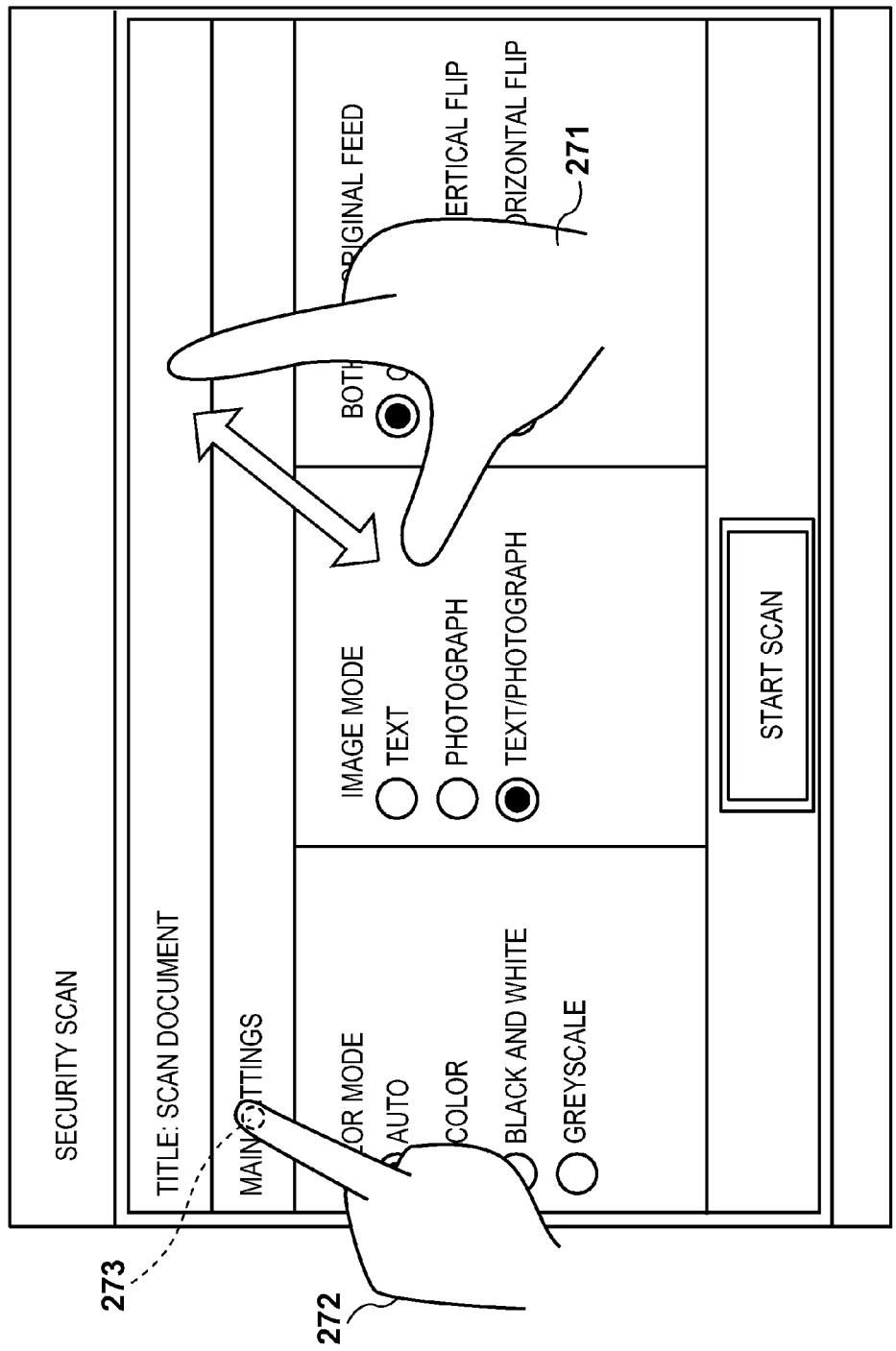
FIG. 5A depicts a view for explaining an operation method for changing a character size of displayed characters in a third embodiment of the present invention.

FIG. 5A depicts a view for explaining an operation method for changing a character size of displayed characters in the third embodiment of the present invention.

Reference numeral 271 denotes a hand action of the user performing the pinch operation on the touch panel 118 arranged on the display unit 119. In the action 271, the orientation of the pinch operation, the display content at the designated point designated with the pinch operation, and the like should be considered in particular. Reference numeral 272 denotes an operation that the user similarly performs on the touch panel 118 for designating another separate point with the hand other than the hand performing the pinch operation. In the instruction by the operation 272, a displayed character exists at the designated point 273.

Specifically, the user, while designating a character on the screen displayed on the display unit 119 by the operation 272, is performing the pinch operation at an arbitrary position on the screen in an instruction with his or her other hand, as denoted by the action 271. When an instruction made with the pinch operation in this way is received, it is determined that the enlargement or reduction of the displayed character size is being instructed, and enlargement or reduction of the character size is performed.

With the pinch operation of FIG. 5A, the operation screen for which enlargement of the displayed character size is performed becomes a screen as shown in FIG. 4A, as in the first embodiment. Also, in a case where the pinch operation is performed with conditions other than those described above, the point that enlargement or reduction of the whole image is performed is the same as in the previously described first embodiment.

Next, with reference to FIG. 9, explanation will be given for operation of the information processing apparatus 101 according to the third embodiment.

Figure 9:
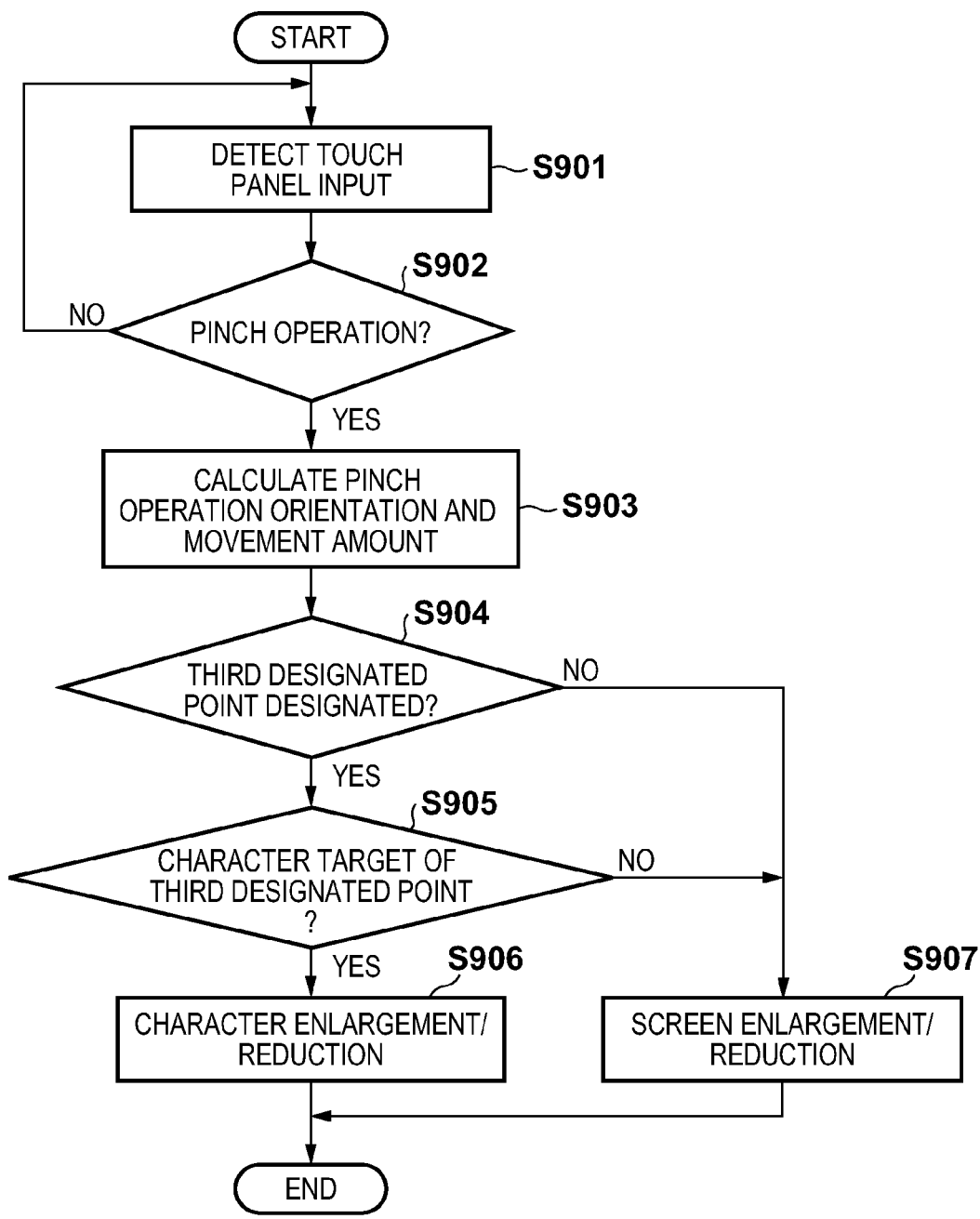
FIG. 9 is a flowchart for describing processing executed when the pinch operation is performed in the information processing apparatus according to the third embodiment.

FIG. 9 is a flowchart for describing processing executed when the pinch operation shown in FIG. 2B or FIG. 5A is performed during display of the operation screen as in FIG. 2A in the information processing apparatus 101 according to the third embodiment. Note, each processing step (step) of the flowchart of FIG. 9 is realized by the CPU 111 executing a control program stored in the ROM 113 or the external memory 120 of the information processing apparatus 101.

Processing in step S901 through step S903 in FIG. 9 is similar to that of step S701 through step S703 in the previously described FIG. 7, and so explanation of these will be omitted. However, in step S902, even in a case where not just two points are designated but rather three points are simultaneously designated, it is determined whether or not two points out of these are performing the pinch operation. In this case, when it is determined that a MOVE is performed, on a one-dimensional line, with one or both of the first two points designated, out of the three points designated, it is determined that the first two points designated are the designated points of the pinch operation. Alternatively, when it is determined that a MOVE is performed, on a one-dimensional line, with one or both of the last two points designated, out of the three points designated, it is determined that the last two points designated are the designated points of the pinch operation.

Next, in step S904, the CPU 111 determines whether or not there is the third designated point designated on the touch panel 118 other than the two designated points determined to be performing the pinch operation on the touch panel 118. Here, in a case where it is determined that there is a designated point other than the designated points of the pinch operation, the processing proceeds to step S905 and the CPU 111 determines whether or not a displayed character exists at the coordinates of the third designated point determined to exist in step S904. The determination as to whether or not a character exists at the coordinates of the designated point is the same as the determination in step S705 of FIG. 7 in the previously described first embodiment.

In a case where, in step S905, it is determined that a character exists at the coordinates of the third designated point, the processing proceeds to step S906 and the CPU 111 performs character size enlargement or reduction processing based on the movement amount of the two points in the pinch operation. The processing here is similar to the processing in step S706 of FIG. 7 in the previously described first embodiment. Meanwhile, in a case where in step S904 it is determined that the third designated point does not exist, or in a case where it is determined, in step S905, that a character does not exist at the coordinates of the third designated point, the processing proceeds to step S907, and the CPU 111 performs whole image enlargement or reduction processing based on movement amounts of the two points in the pinch operation. The processing here is similar to the processing in step S707 of FIG. 7 in the previously described first embodiment.

In this way, with the third embodiment, in a case where it is determined that a designated point exists other than the two points designated in the pinch operation by the user and a displayed character exists at that designated point, it is determined that the pinch operation is an operation for enlargement or reduction of the character size. Also, in a case where the pinch operation is performed under conditions other than this, it is determined that it is an operation for enlargement or reduction of the whole image. With this, it becomes possible to instruct independently enlargement or reduction of the character size and enlargement or reduction of the screen with the pinch operation, and it is possible to easily make these respective instructions without the need for the user to perform cumbersome operation.

Note, in the third embodiment, the fact that the target of the pinch operation is a change in the character size is instructed by pointing to a character with one's other hand. In other words, if the user performs the pinch operation when he or she is designating a character with his or her other hand, the operation is for enlargement or reduction of characters, and if the user simply performs the pinch operation without designating anything with his or her other hand, the operation is for enlargement or reduction of the image screen on the whole. With this, in a case where the characters on the screen are small or a character string is short, even when it is difficult to designate with his or her fingers in the pinch operation, the user can easily instruct that enlargement or reduction of the character size be performed.

Fourth Embodiment

In the fourth embodiment, a condition for determining whether or not the pinch operation is for instructing the enlargement or reduction of the character size when the pinch operation is performed is the determination of whether or not a part of a character string in the screen is already selected. Explanation of the fourth embodiment will be given focusing on differences with the previously described first embodiment. Note, because the hardware configuration of the information processing apparatus 101 according to the fourth embodiment is the same as in the previously described first embodiment, its explanation will be omitted.

Figure 5B:
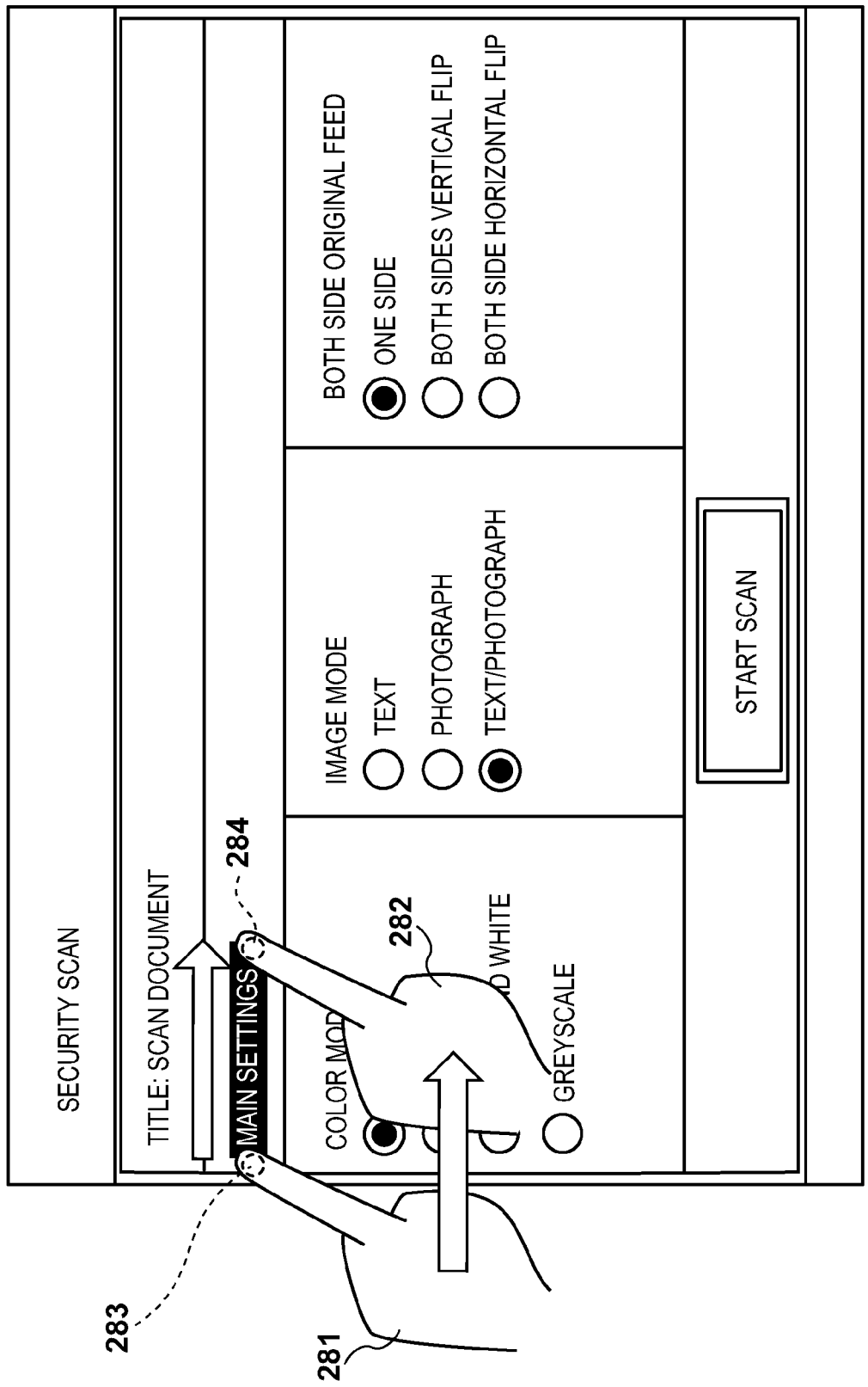
FIG. 5B depicts a view for explaining an operation method for changing the character size of displayed characters in a fourth embodiment.
Figure 6:
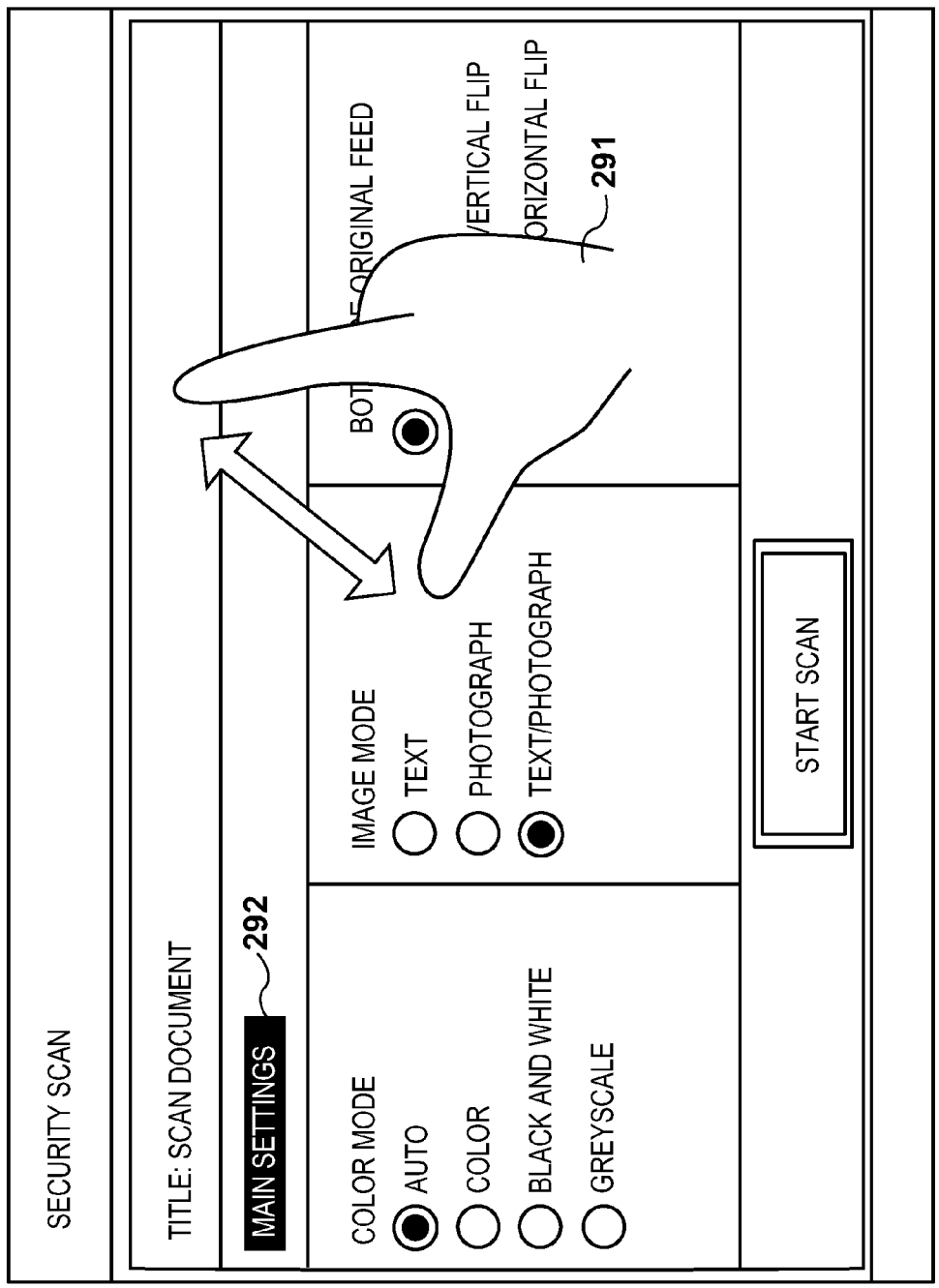
FIG. 6 is a view for explaining an operation method for changing the character size of the displayed characters in the fourth embodiment.

FIG. 5B and FIG. 6 depict views for explaining an operation method for changing a character size of a character according to a fourth embodiment of the present invention.

Reference numerals 281 and 282 in FIG. 5B denote a hand action of the user performing the MOVE operation on the touch panel 118 arranged on the display unit 119. The MOVE operation is performed by the user moving his or her hand from the action 281 to the action 282. Here, the designated point moves from a point 283 to a point 284. In a case where a character exists on the line segment linking these designated points 283 and 284, a selection instruction of this character string is received, and a selected display of the character string is made. Here, the selected character string is displayed with its color having been inverted.

Furthermore, reference numeral 291 of FIG. 6 denotes a hand action of the user performing the pinch operation on the touch panel 118 after having selected the character string in FIG. 5B. In the action 291, the orientation of the pinch operation and the display content of the designated points designated in the pinch operation are not taken into consideration. Also, reference numeral 292 denotes a displayed character string in a selected state, having been selected in FIG. 5B. In this way, in a case where an instruction of the pinch operation is received when any character or character string in the screen is in a selected state, it is determined that enlargement or reduction of the character size is instructed, and an operation of enlargement or reduction of characters is performed based on the movement amount of the two points in the pinch operation.

With the pinch operation of FIG. 6, the operation screen for which enlargement of the displayed character size was performed becomes a screen as shown in FIG. 4A, as in the previously described first embodiment. Also, in a case where the pinch operation is performed with conditions other than those described above, the point that enlargement or reduction of the whole image is performed is the same as in the previously described first embodiment.

Next, with reference to FIG. 10, explanation will be given for operation of the information processing apparatus 101 according to the fourth embodiment.

Figure 10:
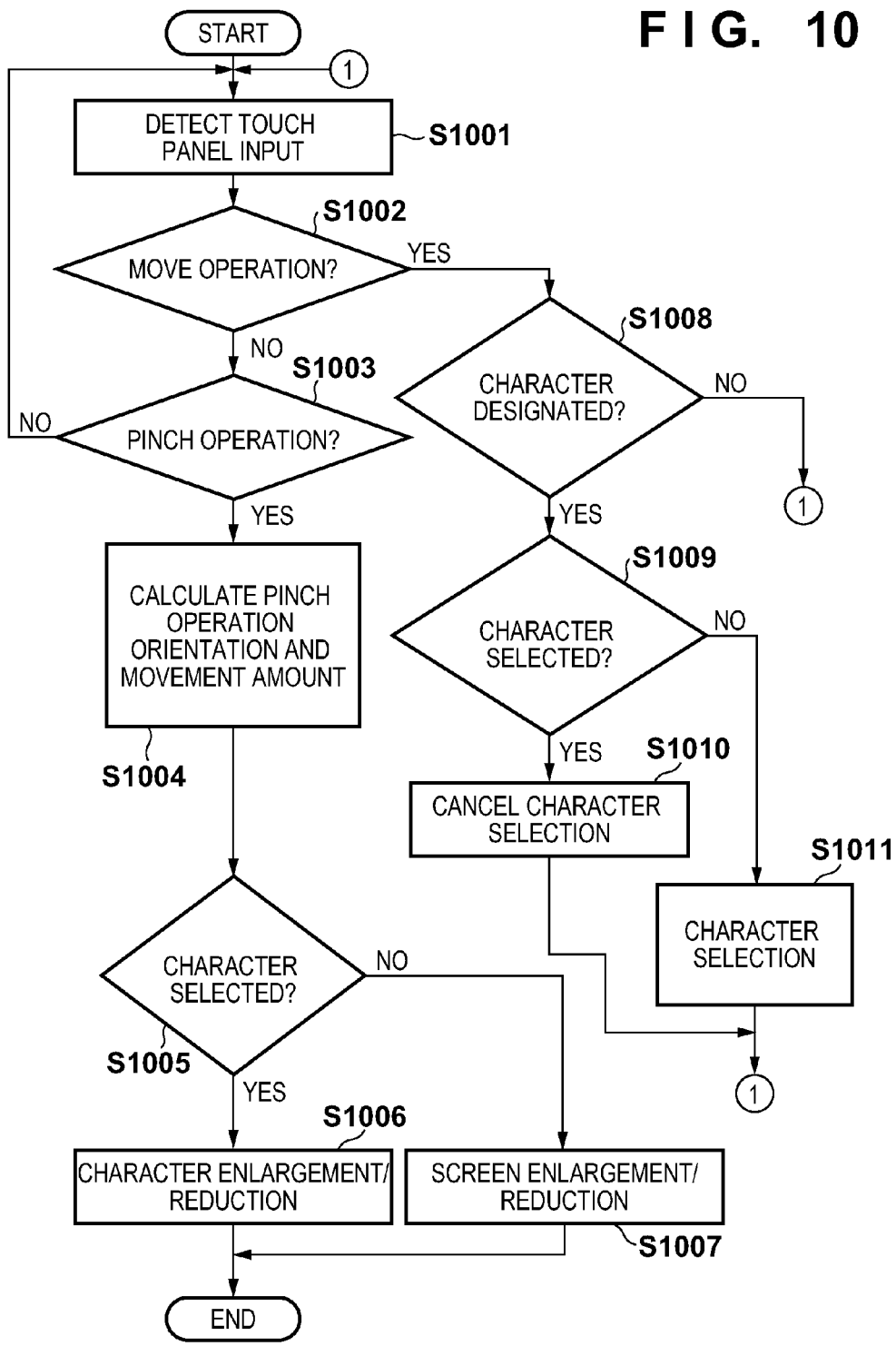
FIG. 10 is a flowchart for describing processing executed when the pinch operation is performed in the information processing apparatus according to the fourth embodiment.

FIG. 10 is a flowchart for describing processing executed when the pinch operation shown in FIG. 5B and FIG. 6 is performed during display of the operation screen as in FIG. 2A in the information processing apparatus 101 according to the fourth embodiment. Note, each processing step of the flowchart of FIG. 10 is realized by the CPU 111 executing a control program stored in the ROM 113 or the external memory 120 of the information processing apparatus 101. Also, in FIG. 10, the processing of step S1003, step S1004, step S1006 and step S1007 is the same as that of step S702, step S703, step S706 and step S707 in FIG. 7 of the first embodiment.

Firstly, in step S1001 the CPU 111 monitors for user operation instructions on the touch panel 118 based on signals input from the touch panel 118 via the input controller 114. In step S1002, the CPU 111 determines whether or not an instruction from the user input from the touch panel 118 is the MOVE operation. In a case where, in step S1002, it is determined that the instruction is for the MOVE operation, the processing proceeds to step S1008 and the CPU 111 determines whether or not a character is displayed at a position at which the MOVE operation is performed. Here, determination as to whether or not the displayed character exists at the coordinates of the MOVE operation is made by comparing the coordinates of the displayed character stored in the RAM 112 and the movement coordinates of the MOVE operation. Here, in a case where it is determined that a character does not exist, the processing returns to step S1001.

In a case where, in step S1008, it is determined that a character does exist at a position of the MOVE operation, the processing proceeds to step S1009 and it is determined whether or not this character is already selected. Information such as positions of characters that are selected is stored in the RAM 112, and it can be determined whether or not the character is currently selected by comparing this information with the coordinates of the character existing on the path of the MOVE operation. In a case where it is determined that the character has been selected, the processing proceeds to step S1010 and the CPU 111 cancels the selected state of the character. Here, the information indicating the selected state of the character stored in the RAM 112 is cleared, the rendering of the selected state displayed by inverted color rendering is cancelled, and redisplay is performed with normal rendering.

On the other hand, in a case where in step S1009 a character existing on the coordinates of the move operation is not in the selected state, the processing proceeds to step S1011, and the CPU 111 sets the character to the selected state. Here, the CPU 111 stores into the RAM 112 information indicating the fact that the character is in the selected state. Furthermore, redrawing is performed, displaying the character in inverted color, or the like to indicate the selected state. The display indicating the selected state may be anything and there are embodiments other than the inverted color display having a change of color, an addition of a mark or symbol, and so on. After execution of the processing in step S1010 or step S1011, the processing returns to step S1001.

Also, in a case where it is determined that it is not a move operation in step S1002, the processing proceeds to step S1003 and the CPU 111 determines whether or not the operation instructed by the user is the pinch operation. The processing of step S1003 and in the following step S1004 is the same as step S702 and step S703 in the previously described first embodiment. In a case where it is determined that it is the pinch operation in step S1003, the processing proceeds to step S1004 and the CPU 111 calculates the direction and the movement amount. Next the processing proceeds to step S1005 and the CPU 111 determines whether or not currently a character within the operation screen is in the selected state. Information is stored in the RAM 112, for example, in step S1011, for whether or not a character is in the selected state. Based on this information, it is determined whether or not a character is in the selected state. In a case where it is determined that a character is in the selected state, the processing proceeds to step S1006 and the CPU 111 performs character size enlargement or reduction processing. This is similar processing to that of step S706 of FIG. 7 in the first embodiment.

Also, in step S1005, in a case where it is determined that no character is in the selected state, the processing proceeds to step S1007 and the CPU 111 performs whole image enlargement or reduction processing. The processing here is similar to the processing in step S707 of FIG. 7 in the previously described first embodiment.

In this way, with the fourth embodiment, in a case where the pinch operation is performed in a state in which a character is first put into the selected state, it is determined that the pinch operation is a operation for enlargement or reduction of the character size. Also, in any other case where the pinch operation is performed, it is determined that it is an operation for the enlargement or reduction of the whole image. With this, it is possible to independently instruct both the enlargement or reduction of the character size and the enlargement or reduction of the whole image respectively with the pinch operation. Thus, the user can easily instruct each of these without the need for cumbersome operation.

In the fourth embodiment, the fact that the target of the pinch operation is a character is instructed by first setting a character or a character string to be in the selected state. In other words, in a case where the enlargement or reduction of a character is to be instructed, after first putting the character or character string into the selected state with the move operation, the pinch operation is instructed, making the target the characters. With this, even in a case where due to the physical position between the information processing apparatus 101 and the user or restriction on the size of the display unit, specifying a direction of the pinch operation is difficult, and both hands cannot be used, it is possible to easily perform an instruction of the enlargement or reduction of the character size.

Fifth Embodiment

In the fifth embodiment, in a case where a character is shown within a specific region, it is determined whether or not the pinch operation instructs the enlargement or reduction of the character size based on whether or not the pinch operation is performed within the specific region. Note, because the hardware configuration of the information processing apparatus 101 according to the fifth embodiment is the same as in the previously described first embodiment, its explanation will be omitted.

FIG. 11A through FIG. 13 depict views for explaining operation on the screen of the display unit 119 of the information processing apparatus 101 or on the touch panel 118 arranged on the screen according to the fifth embodiment of the present invention. Below, with reference to FIG. 11A through FIG. 13, explanation is given of a display example of the display unit 119 according to the fifth embodiment of the present invention and of operation on the touch panel 118 arranged on the screen.

FIG. 11A depicts a view for illustrating an example of a function selection screen for selecting out of a plurality of functions that the information processing apparatus 101 according to a fifth embodiment has. This function selection screen is a initial screen displayed after the information processing apparatus 101 launches.

FIG. 11A shows a function selection screen 1111. In this function selection screen 1111 a setting screen is displayed. A region 1112 in the upper part of the screen in FIG. 11A is a region for displaying a title of the display screen. This always displays a set title unrelated to the display content of the function selection screen 1111. A region 1113 in the bottom part of the screen in FIG. 11A is a display area of the device status. In a case where there is a change in the status of the information processing apparatus 101 such as an error, this display area notifies the user of this content. The region 1113 displays set content unrelated to the display content of the function selection screen 1111.

The function selection buttons 1114 to 1118 are operation buttons for selecting one of a plurality of functions of the information processing apparatus 101. In this function selection screen 1111, in a case where the characters displayed on the screen is small and difficult to see, the user wishes to enlarge the characters or the display screen.

FIG. 11B depicts a view for explaining enlarging an image by a pinch operation.

Reference numeral 1121 denotes a hand action of the user performing the pinch operation on the touch panel 118 arranged on the display unit 119. In the pinch operation of FIG. 11B, neither of a designated point 1122 or a designated point 1123 of the two finger user operation shown in the action 1121 touches the function selection buttons 1114 to 1118. Here, the pinch operation of FIG. 11B is determined to be an instruction for enlargement or reduction of the whole image, and enlargement processing of the function selection screen 1111 is performed.

Figure 12A:
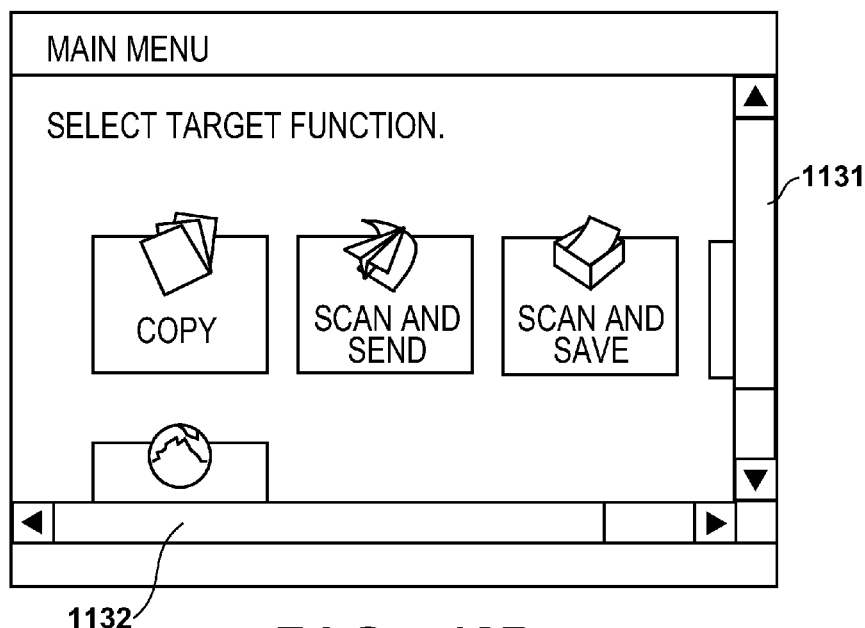
FIG. 12A depicts a view for illustrating an example of an operation screen when an image is actually enlarged by the pinch operation of FIG. 11B according to the fifth embodiment.

FIG. 12A depicts a view for illustrating an example of an operation screen when an image is actually enlarged by the pinch operation of FIG. 11B according to the fifth embodiment. In FIG. 12A, the function selection screen 1111 of FIG. 11A is enlarged in its entirety while maintaining the horizontal to vertical aspect ratio. By enlarging the entirety of the function selection screen in this way, it becomes impossible to fit all of the display into the display area of the screen and so a part of the display sticks out of the screen. For this reason, scroll bars 1131 and 1132 are displayed in the right part and the bottom part of the screen. By operating these scroll bars 1131 and 1132, it is possible to display a part that is not displayed by scrolling. In FIG. 12A, along with the function selection screen 1111 being enlarged, the displayed characters are also enlarged and displayed. So, with the pinch operation shown in the action 1121 of FIG. 11B, the whole image of the function selection screen 1111 is enlarged, and as a result the user is able to display the image in a desired character size as in the screen of FIG. 12A.

However, in FIG. 12A, because the whole image is enlarged, a part of the function selection buttons is hidden from the display of the function selection screen 1111. Because of this, in a case where these partially hidden function selection buttons are to be selected, it is necessary to go to the trouble of operating the scroll bars 1131 and 1132 to display the hidden part of the screen, or to reduce the screen by once again performing the pinch operation.

Figure 12B:
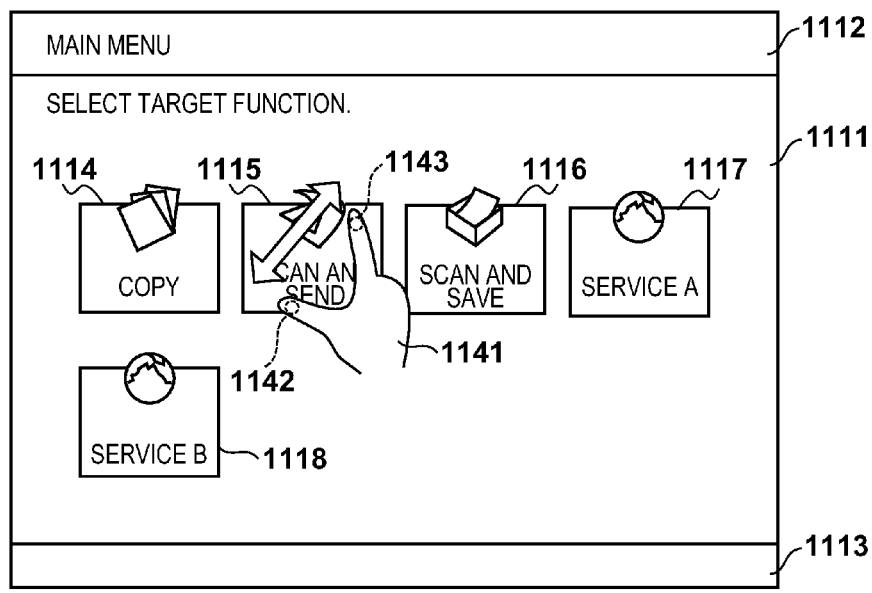
FIG. 12B depicts a view for explaining an operation method for changing a displayed character size in the fifth embodiment.

FIG. 12B depicts a view for explaining an operation method for changing a displayed character size in the fifth embodiment.

Reference numeral 1141 denotes a hand action of the user performing the pinch operation on the touch panel 118 arranged on the display unit 119. Each of designated point 1142 and 1143 of the user's two fingers exists within an area of the same function selection button (here, a function selection button 1115). When an operation instruction is received upon such a pinch operation, it is determined that it is an instruction for enlargement or reduction of the characters, and based on the movement amount of the two points in the pinch operation, the enlargement or reduction of the characters is performed.

Figure 13:
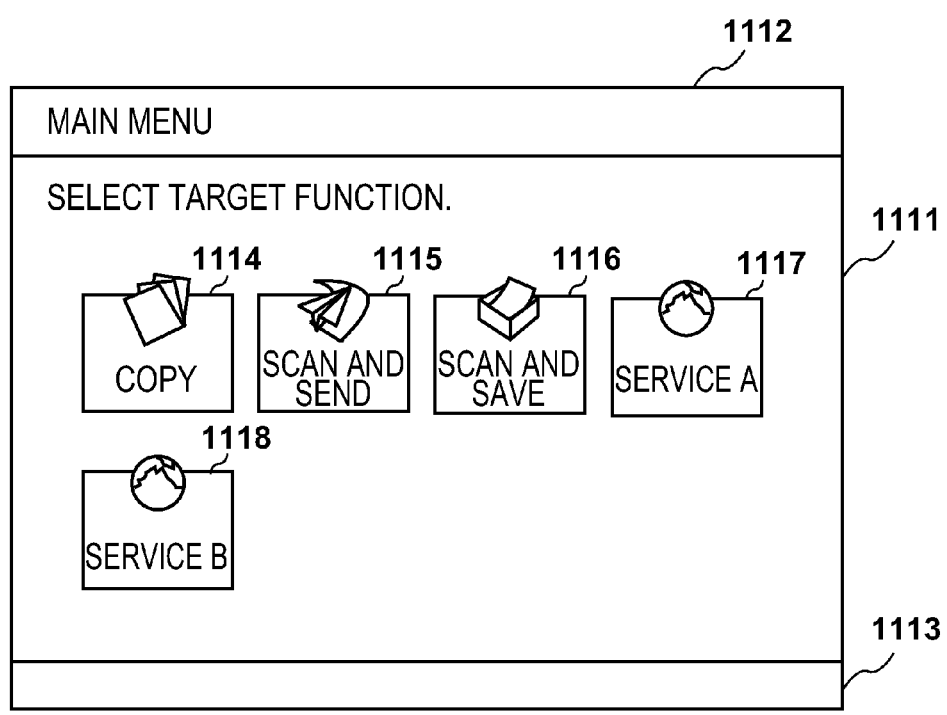
FIG. 13 depicts a view for showing an operation screen on which an enlargement of the displayed characters is actually performed by the pinch operation of FIG. 12A according to the fifth embodiment.

FIG. 13 depicts a view for showing an operation screen upon which the enlargement of the displayed characters has been performed by the pinch operation shown in FIG. 12B. In FIG. 13, only the character size becomes larger in the function selection screen of FIG. 11A. For this reason, since the screen layout other than the characters does not change, selection of all of the function selection buttons 1114 to 1118 is possible without the necessity of special operation for screen transition.

In this way, by the fifth embodiment, it is possible to separately make, with the pinch operation, both an image enlargement or reduction instruction for whole image of the operation screen and a displayed character size enlargement or reduction instruction for the operation screen.

Next, explanation will be given for operation of the information processing apparatus 101 according to the fifth embodiment with reference to FIG. 14.

Figure 14:
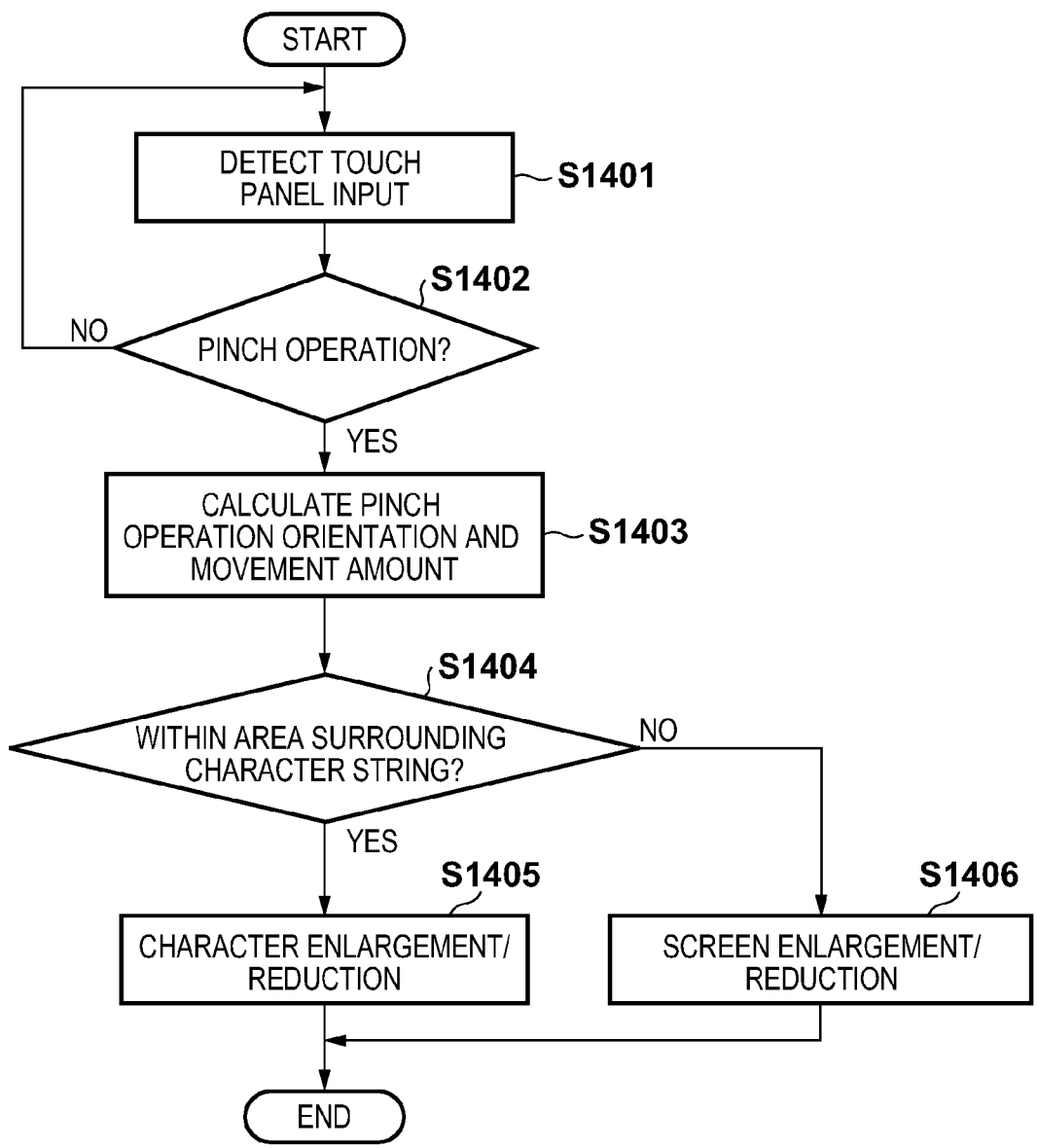
FIG. 14 is a flowchart for describing processing executed when the pinch operation in FIG. 11B

FIG. 14 is a flowchart for describing processing executed when the pinch operation in FIG. 11B or FIG. 12B is performed during display of the operation screen as in FIG. 11A in the information processing apparatus 101 according to the fifth embodiment. Each processing step of the flowchart of FIG. 14 is realized by the CPU 111 executing a control program stored in the ROM 113 or the external memory 120 of the information processing apparatus 101.

Firstly, in step S1401, the CPU 111 monitors for an operation instruction in the touch panel 118 based on signals from the touch panel 118 via the input controller 114. Next, the processing proceeds to step S1402 and the CPU 111 determines whether or not the instruction from the user input from the touch panel 118 is a pinch operation. In a case where it is determined in step S1402 that the pinch operation is not performed, the processing returns to step S1401. In a case where it is determined in step S1402 that the pinch operation is performed, the processing proceeds to step S1403 and the CPU 111 calculates the specified coordinates and the movement amount of the pinch operation.

Next, the processing proceeds to step S1404, and the CPU 111 determines whether or not the coordinates of the two specified points of the pinch operation are within an area surrounding the character string existing within the function selection screen 1111. In the fifth embodiment, it is determined whether or not the coordinates of the two designated points in the pinch operation are within a display area of any of the buttons of the function selection buttons 1114 to 1118 in the function selection screen 1111. Because the coordinates on the touch panel 118 and the coordinates on the display unit 119 are pre-determined, it is easy to associate these. The CPU 111 stores coordinates and size of the function selection buttons indicated to be displayed to the display controller 115 in the RAM 112. By comparing this with the previously mentioned coordinates of the designated points of the pinch operation, it is possible to determine whether or not the designated points of the pinch operation exist within the area of the function selection button. Also, in a case where the function selection screen 1111 displays a structured document such as an HTML document with a Web browser or the like, the display coordinates of the function selection buttons area similarly stored in the RAM 112. For this reason, it is easy to determine whether or not the designated points of the pinch operation exist within the display areas of the function selection buttons.

In step S1404, in a case where it is determined that the coordinates of the two designated points of the pinch operation exist within the display area of any of the function selection buttons, the processing proceeds to step S1405, and the CPU 111 performs character size enlargement or reduction processing based on the movement amount of the two points in the pinch operation. Here, based on the movement amount of the pinch operation calculated in step S1403, processing is performed for enlargement if the distance between the two points increases and reduction if it decreases. Also, the enlargement amount or the reduction amount is made to be proportional to the movement amount of the pinch operation. With this, the size of the character strings after the enlargement or reduction is calculated for each character string, and the screen on the whole is reconfigured using these character sizes and displayed on the display unit 119 via the display controller 115.

On the other hand, in a case where, in step S1404, it is determined that the coordinates of the two designated points of the pinch operation do not exist within the display area of the function selection buttons, the processing proceeds to step S1406, and the CPU 111 performs whole image enlargement or reduction processing based on the movement amount of the two points in the pinch operation. In this case as well, based on the movement amount of the pinch operation calculated in step S1403, processing is performed for enlargement if the distance between the two points increases and reduction if it decreases. Also, the enlargement amount or the reduction amount is made to be proportional to the movement amount of the pinch operation. With this, the sizes of each constituent element of the screen for after the enlargement or reduction is calculated, and based on this, the display screen on the whole is reconfigured, and display to the display unit 119 via the display controller 115 is performed. Here, in a case where there is content which does not fit onto the screen due to the enlargement, the scroll bars are displayed on the right part and the bottom part of the screen.

In this way, with the fifth embodiment, in a case where the designated points of the pinch operation by the user exist within a region surrounding a character string, it is determined that the operation is for an enlargement or reduction of the character size of the pinch operation. Also, in a case where the pinch operation is performed in other conditions, it is determined that the operation is for an enlargement or reduction of the whole image. Often, in the operation screen, the character string is displayed within some kind of area such as an operation button. The user can intuitively specify enlargement or reduction of the characters by performing the pinch operation in such an area. Also, in a case where characters are too small or too large, because, rather than directly specifying the desired size, instead the pinch operation can be performed within the area of the button, et cetera, the operation instruction is simple.

As explained above, with the first through fifth embodiments, if the pinch operation of the user satisfies a predetermined condition (first condition), it is determined that the pinch operation is for an enlargement or reduction of a character size. On the other hand, when the pinch operation of the user does not satisfy the aforementioned predetermined condition as explained above, but satisfies a second condition, the pinch operation is determined to be an operation for enlargement or reduction of the size of the whole image being displayed.

Because of this, with the pinch operation, independent specification of enlargement or reduction of the character size and enlargement or reduction of the whole image becomes possible, and the user can specify each with simple operation without the need for cumbersome operation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-211531, filed Sep. 25, 2012, which is hereby incorporated by reference herein in its entirety.

What is claimed is:

1. An information processing apparatus having a display and an input device capable of detecting a plurality of designated points designated on a screen of the display, the apparatus comprising:

a processor implementing the functions of an image enlargement/reduction unit, a character enlargement/reduction unit, a detection unit and a control unit, wherein:

the image enlargement/reduction unit configured to perform enlargement or reduction of a whole image displayed on the display;

the character enlargement/reduction unit configured to perform, independently of the image enlargement/reduction unit, enlargement or reduction of a character included in the whole image displayed on the display;

the detection unit configured to detect a plurality of coordinates of a plurality of designated points that a user designates on the input device, a movement of the coordinates, and a change in a distance between two designated points accompanying the movement; and the control unit configured to determine, in response to a predetermined operation of a user designating at least two points being detected by the detection unit, whether to perform enlargement or reduction of the whole image by the image enlargement/reduction unit or to perform enlargement or reduction of the character included in the whole image by the character enlargement/reduction unit, without performing enlargement or reduction of the whole image, based on satisfaction of a predetermined condition, wherein the control unit controls the image enlargement/reduction unit to perform enlargement or reduction of the whole image displayed on the display unit in a case where an operation of the user detected by the detection unit is the predetermined operation and the predetermined condition is not satisfied, and the control unit controls the character enlargement/reduction unit to perform enlargement or reduction of the character included in the whole image without performing enlargement or reduction of the whole image, in a case where an operation of the user detected by the detection unit is the predetermined operation and the predetermined condition is satisfied.

2. The information processing apparatus according to claim 1, wherein the predetermined operation is a pinch operation designating two points.

3. The information processing apparatus according to claim 1, wherein the predetermined condition is that a movement orientation of two points designated in the predetermined operation is horizontal with respect to the screen of the display and that a displayed character exists at a center point or vicinity of the center point between the two points designated in the predetermined operation.

4. The information processing apparatus according to claim 1, wherein the predetermined condition is that at least one of the at least two points designated in the predetermined operation designates a displayed character, and a movement orientation of two points designated in the predetermined operation matches an orientation of a character string including the character.

5. The information processing apparatus according to claim 1, wherein the predetermined condition is that when the predetermined operation is detected, a point that the user designated other than the at least two points designates a character displayed on the display.

6. The information processing apparatus according to claim 1, wherein the predetermined condition is that a character string displayed on the display is selected before the predetermined operation.

7. The information processing apparatus according to claim 1, wherein the predetermined condition is that the predetermined operation is within an area surrounding a character string displayed on the display.

8. The information processing apparatus according to claim 7, wherein the area surrounding the character string displayed on the display is an operation button.

9. The information processing apparatus according to claim 1, wherein the control unit designates an enlargement amount or a reduction amount to the image enlargement/reduction unit or to the character enlargement/reduction unit in accordance with a change in a distance between two points designated in the predetermined operation detected by the detection unit.

10. A method of controlling an information processing apparatus having a display unit and an input device capable of detecting a plurality of designated points designated on a screen of the display unit, the method comprising:

performing enlargement or reduction of a whole image displayed on the display unit;

performing enlargement or reduction of a character included in the whole image displayed on the display unit independently of the performing enlargement or reduction of the whole image;

detecting a plurality of coordinates a plurality of designated points that a user designates on the input device, a movement of the coordinates, and a change in a distance between two designated points accompanying the movement; and determining, in response to detection of a predetermined operation of a user designating at least two points in the detecting step, whether to perform enlargement or reduction of the whole image by the image enlargement/reduction unit or to perform enlargement or reduction of the character included in the whole image by the character enlargement/reduction unit, without performing enlargement or reduction of the whole image, based on satisfaction of a predetermined condition, wherein enlargement or reduction of the whole image displayed on the display unit is performed in a case where an operation of the user detected in the detecting is the predetermined operation and the predetermined condition is not satisfied, and enlargement or reduction of the character included in the whole image is performed, without performing enlargement or reduction of the whole image, in a case where an operation of the user detected in the detecting is the predetermined operation and the predetermined condition is satisfied.

11. A non-transitory computer-readable storage medium storing a program for causing a computer to execute a method of controlling an information processing apparatus having a display unit and an input device capable of detecting a plurality of designated points designated on a screen of the display unit, the method comprising:

performing enlargement or reduction of a whole image displayed on the display unit;

performing enlargement or reduction of a character included in the whole image displayed on the display unit independently of the performing enlargement or reduction of the whole image;

detecting a plurality of coordinates a plurality of designated points that a user designates on the input device, a movement of the coordinates, and a change in a distance between two designated points accompanying the movement; and determining, in response to detection of a predetermined operation of a user designating at least two points in the detecting step, whether to perform enlargement or reduction of the whole image by the image enlargement/reduction unit or to perform enlargement or reduction of the character included in the whole image by the character enlargement/reduction unit, without performing enlargement or reduction of the whole image, based on satisfaction of a predetermined condition, wherein enlargement or reduction of the whole image displayed on the display unit is performed in a case where an operation of the user detected in the detecting is a predetermined operation and the predetermined condition is not satisfied, and enlargement or reduction of the character included in the whole image is performed, without performing enlargement or reduction of the whole image, in a case where an operation of the user detected in the detecting is the predetermined operation and the predetermined condition is satisfied.

12. The information processing apparatus in accordance with claim 1, wherein satisfaction of the predetermined condition is determined based on one or more of: movement orientation of the predetermined operation, location of the predetermined operation relative to the character included in the whole image, selection state of the character included in the whole image, and designation of an additional point other than the at least two points at a location of the character included in the whole image.

* * * * *